(12) United States Patent
Khanafer et al.

(10) Patent No.: US 12,346,921 B2
(45) Date of Patent: Jul. 1, 2025

(54) SYSTEMS AND METHODS FOR DYNAMIC DEMAND SENSING AND FORECAST ADJUSTMENT

(71) Applicant: Kinaxis Inc., Ottawa (CA)

(72) Inventors: Ali Khanafer, Ottawa (CA); Behrouz Haji Soleimani, Ottawa (CA); Sebastien Ouellet, Ottawa (CA); Christopher Wang, Ottawa (CA); Chantal Bisson-Krol, Ottawa (CA); Zhen Lin, Ottawa (CA)

( * ) Notice: Subject to any disclaimer, the term of this patent is extended or adjusted under 35 U.S.C. 154(b) by 198 days.

(21) Appl. No.: 18/456,111

(22) Filed: Aug. 25, 2023

(65) Prior Publication Data

US 2023/0401592 A1     Dec. 14, 2023

Related U.S. Application Data

(63) Continuation-in-part of application No. 18/071,802, filed on Nov. 30, 2022, which is a continuation of
(Continued)

(51) Int. Cl.
| | | |
|---|---|---|
| G06Q 30/02 | (2023.01) | |
| G06F 18/20 | (2023.01) | |
| G06F 18/21 | (2023.01) | |
| G06F 18/211 | (2023.01) | |
| G06F 18/22 | (2023.01) | |
| G06F 18/25 | (2023.01) | |

(Continued)

(52) U.S. Cl.
CPC ....... *G06Q 30/0205* (2013.01); *G06F 18/211* (2023.01); *G06F 18/217* (2023.01); *G06F 18/22* (2023.01); *G06F 18/251* (2023.01); *G06F 18/285* (2023.01); *G06N 20/00* (2019.01)

(58) Field of Classification Search
CPC ...................................................... G06Q 30/02
USPC ...................................................... 705/7.31
See application file for complete search history.

(56) References Cited

U.S. PATENT DOCUMENTS

| | | |
|---|---|---|
| 7,257,513 B2 | 8/2007 | Lilly |
| 7,792,353 B2 | 9/2010 | Forman et al. |

(Continued)

FOREIGN PATENT DOCUMENTS

| | | |
|---|---|---|
| CA | 3057521 A1 | 9/2018 |
| JP | H11316763 A | 11/1999 |

(Continued)

OTHER PUBLICATIONS

U.S. Appl. No. 16/697,620, Final office Action dated Feb. 1, 2024.
(Continued)

*Primary Examiner* — Nga B Nguyen
(74) *Attorney, Agent, or Firm* — Borden Ladner Gervais LLP; Scott Dybwad

(57) ABSTRACT

Systems and methods for dynamic demand sensing in a supply chain in which constantly-updated data is used to select a machine learning model or retrain a pre-selected machine learning model, for forecasting sales of a product at a specific location. The updated data includes product information and geographic information. Also disclosed are systems and methods relating to demand forecasting and readjusting forecasts based on forecast error.

18 Claims, 18 Drawing Sheets

Related U.S. Application Data application No. 16/837,182, filed on Apr. 1, 2020, now Pat. No. 11,537,825, which is a continuation-in-part of application No. 16/599,143, filed on Oct. 11, 2019, now Pat. No. 11,526,899.

(60) Provisional application No. 63/518,713, filed on Aug. 10, 2023.

(51) Int. Cl.
    *G06N 20/00*       (2019.01)
    *G06Q 30/0204*     (2023.01)

(56) References Cited

U.S. PATENT DOCUMENTS

| | | | |
|---|---|---|---|
| 9,218,574 | B2 | 12/2015 | Phillipps et al. |
| 9,785,951 | B1 | 10/2017 | Coleman et al. |
| 10,002,329 | B2 | 6/2018 | Mehanna et al. |
| 10,102,476 | B2 | 10/2018 | Caraviello et al. |
| 10,192,243 | B1 | 1/2019 | Genc-Kaya et al. |
| 10,255,550 | B1 | 4/2019 | Simkoff et al. |
| 10,402,788 | B2 | 9/2019 | Morrow et al. |
| 11,526,899 | B2 | 12/2022 | Ouellet et al. |
| 11,537,825 | B2 | 12/2022 | Ouellet et al. |
| 11,875,367 | B2 * | 1/2024 | Ouellet ............... G06F 18/217 |
| 12,271,920 | B2 * | 4/2025 | Ouellet .............. G06Q 30/0205 |
| 2010/0088344 | A1 | 4/2010 | Treat et al. |
| 2010/0138273 | A1 | 6/2010 | Bateni et al. |
| 2012/0303411 | A1 | 11/2012 | Chen et al. |
| 2012/0303412 | A1 | 11/2012 | Etzioni et al. |
| 2012/0311637 | A1 | 12/2012 | Anthru et al. |
| 2013/0166350 | A1 | 6/2013 | Willemain et al. |
| 2014/0122401 | A1 | 5/2014 | Collica |
| 2014/0137067 | A1 | 5/2014 | Duff |
| 2014/0156346 | A1 | 6/2014 | Cai |
| 2014/0236875 | A1 | 8/2014 | Phillipps et al. |
| 2014/0358828 | A1 | 12/2014 | Phillipps et al. |
| 2015/0019204 | A1 | 1/2015 | Simard et al. |
| 2015/0356774 | A1 | 12/2015 | Gal et al. |
| 2015/0379072 | A1 | 12/2015 | Dirac et al. |
| 2015/0379429 | A1 | 12/2015 | Lee et al. |
| 2016/0078022 | A1 | 3/2016 | Lisuk et al. |
| 2016/0092519 | A1 | 3/2016 | Srivastava et al. |
| 2016/0171682 | A1 | 6/2016 | Abedini et al. |
| 2016/0260052 | A1 | 9/2016 | Ray et al. |
| 2016/0358599 | A1 | 12/2016 | Sturlaugson et al. |
| 2017/0032279 | A1 | 2/2017 | Miserendino et al. |
| 2017/0061329 | A1 | 3/2017 | Kobayashi et al. |
| 2017/0124487 | A1 | 5/2017 | Szeto et al. |
| 2017/0270484 | A1 | 9/2017 | Cengiz et al. |
| 2017/0308976 | A1 | 10/2017 | Eidelman et al. |
| 2017/0315523 | A1 | 11/2017 | Cross et al. |
| 2018/0047071 | A1 | 2/2018 | Hsu et al. |
| 2018/0053116 | A1 | 2/2018 | Cai et al. |
| 2018/0240013 | A1 | 8/2018 | Strope et al. |
| 2018/0247227 | A1 | 8/2018 | Holtham |
| 2018/0300576 | A1 | 10/2018 | Dalyac et al. |
| 2018/0308051 | A1 | 10/2018 | Nemati et al. |
| 2018/0373208 | A1 | 12/2018 | Wee et al. |
| 2018/0374109 | A1 | 12/2018 | Scarpati et al. |
| 2019/0018823 | A1 | 1/2019 | Yabe et al. |
| 2019/0102693 | A1 | 4/2019 | Yates et al. |
| 2019/0108417 | A1 | 4/2019 | Talagala et al. |
| 2019/0130425 | A1 | 5/2019 | Lei et al. |
| 2019/0147350 | A1 | 5/2019 | Bai et al. |
| 2019/0156357 | A1 | 5/2019 | Palinginis et al. |
| 2019/0156485 | A1 | 5/2019 | Pfeiffer |
| 2019/0228590 | A1 | 7/2019 | Kaifosh et al. |
| 2019/0250891 | A1 | 8/2019 | Kumar et al. |
| 2019/0272557 | A1 | 9/2019 | Smith et al. |
| 2020/0005340 | A1 | 1/2020 | T. |
| 2020/0042896 | A1 | 2/2020 | Ko et al. |
| 2020/0065424 | A1 | 2/2020 | Ananthapur Bache et al. |
| 2020/0074402 | A1 | 3/2020 | Adato et al. |
| 2020/0090009 | A1 | 3/2020 | Arora et al. |
| 2020/0097709 | A1 | 3/2020 | Huang et al. |
| 2020/0098055 | A1 | 3/2020 | O'Hara et al. |
| 2020/0111109 | A1 | 4/2020 | Lei et al. |
| 2020/0130425 | A1 | 4/2020 | Sorrentino et al. |
| 2020/0134641 | A1 | 4/2020 | Morgan et al. |
| 2020/0134642 | A1 | 4/2020 | Morgan et al. |
| 2020/0184494 | A1 | 6/2020 | Joseph et al. |
| 2020/0191594 | A1 | 6/2020 | Watanabe |
| 2020/0210920 | A1 | 7/2020 | Joseph et al. |
| 2020/0226504 | A1 | 7/2020 | Keng et al. |
| 2020/0250556 | A1 | 8/2020 | Nourian et al. |
| 2020/0380541 | A1 | 12/2020 | Laing et al. |
| 2021/0110429 | A1 | 4/2021 | Keng et al. |
| 2022/0292308 | A1 | 9/2022 | Schwiep et al. |
| 2022/0318711 | A1 | 10/2022 | Recasens et al. |
| 2022/0382857 | A1 | 12/2022 | Liu et al. |
| 2023/0091610 | A1 | 3/2023 | Tamazlykar et al. |
| 2023/0401468 | A1 | 12/2023 | Venkitaraman et al. |

FOREIGN PATENT DOCUMENTS

| | | |
|---|---|---|
| JP | 2010282483 A | 12/2010 |
| JP | 2014067154 A | 4/2014 |
| JP | 2018147261 A | 9/2018 |
| JP | 2018526732 A | 9/2018 |
| JP | 2018537798 A | 12/2018 |
| WO | 2017135314 A1 | 8/2017 |
| WO | 2019055957 A1 | 3/2019 |

OTHER PUBLICATIONS

Japanese Patent Application No. 2023-007474, Office action dated Oct. 3, 2024—English Translation available.

Tanaka, et al., "Implementation of Information Exploring Support Environment (1) Information Classifying System Based on Self-Organizing Mechanism," Technical Report of IEICE, 1996, vol. 96 (431), pp. 55-62.

U.S. Appl. No. 16/697,620, Notice of Allowance dated Oct. 15, 2024.

AWS: "Amazon Machine Learning Developer Guide," Precodata, 2017, 152 pages [Retrieved on Jul. 12, 2024] Retrieved from [https://www.precodata.com/wp-content/uploads/pdf/AWS-MachineLearning.pdf].

Kilian.,"Feature Engineering: Explanation, Methods and Examples," 2020, https://datadrivencompany.de/feature-engineering-erklaerung-methods-and-examples/ [researched on Jul. 10, 2024] 28 pages.

Rameseder., "Forecasts: Everyone Needs Them, No One Can Scale Them," Digital Transformation , 2018, https://digitalweltmagazin. de/forecasts-jeder-bedarf-sie-nichter-kann-sie-skalieren/ [researched on Jul. 11, 2024] 18 Pages.

Japanese Patent Application No. 2022-522579, Office Action dated Aug. 14, 2024 (English Translation Available).

Badam et al., "Time Fork: Interactive Prediction of Time Series," CHI '16: Proceedings of the 2016 CHI Conference on Human Factors in Computing Systems May 2016, pp. 5409-5420.

Canadian Patent Application No. 3,154,982 Office Action dated Jun. 29, 2023.

Du, K.L., "Clustering: A Neural Network Approach," Neural Networks : The Official Journal of the International Neural Network Society, 2010, vol. 23 (1), pp. 89-107.

European Patent Application No. 20877770.6, Extended European Search Report dated Nov. 21, 2023.

European U.S. Appl. No. 20/876,015, Extended European Search Report dated Sep. 1, 2023.

Hu et al., "Identifying the "Ghost City" of Domain Topics in a Keyword Semantic Space Combining Citations," Scientometrics, 2018, vol. 114(3), 1141-1157.

International Patent Application No. PCT/CA2020/051379, International Preliminary Report on Patentability dated Jan. 5, 2022.

International Preliminary Report on Patentability from related PCT International Application No. PCT/CA2020/051378, transmitted on Jan. 25, 2022, pp. 1-5.

(56) References Cited

OTHER PUBLICATIONS

International Search Report from related PCT International Application No. PCT/CA2020/051347, transmitted on Jan. 8, 2021.
International Search Report from related PCT International Application No. PCT/CA2020/051378, transmitted on Dec. 16, 2020.
International Search Report from related PCT International Application No. PCT/CA2020/051379, transmitted on Jan. 4, 2021.
Japanese Patent Application No. JP2022-521962, Office Action dated Oct. 21, 2022.
PC Review Discussion Forum, "On Scatter Chart, How Can data Points be Moved with Curser?", Posts Dated Feb. 8, 2010, available at https://www.pcreview.co.uk/threads/on-scatter-chart-how-can-data-points-be-moved-with-curser.3965453/, accessed Sep. 11, 2023. 1 page. (Year: 2010).
Runkler et al., "Generation of Linguistic Membership Functions from Word Vectors," IEEE International Conference on Fuzzy Systems, Jul. 2016, pp. 993-999.
Sherkat et al., "Interactive Document Clustering Revisited: A Visual Analytics Approach," IUI2018: 23rdInternational Conference on Intelligent User Interfaces, Mar. 2018, pp. 281-292.
U.S. Appl. No. 16/697,620, Final office action dated Feb. 9, 2023.
U.S. Appl. No. 16/697,620, Non-Final office Action dated Jul. 31, 2023.
U.S. Appl. No. 16/697,620, Office Action dated Apr. 29, 2022.
U.S. Appl. No. 16/697,620, Office Action dated Jul. 13, 2022.
U.S. Appl. No. 16/699,010, Final Office Action dated Apr. 24, 2023.
U.S. Appl. No. 16/699,010, Non-Final office Action dated Sep. 18, 2023.
U.S. Appl. No. 16/848,266, Final Office Action dated Apr. 14, 2022.
U.S. Appl. No. 16/848,266, Non-Final Office Action dated Sep. 29, 2021.
U.S. Appl. No. 16/599,143, Final Office Action dated Feb. 3, 2022.
U.S. Appl. No. 16/599,143, Non-Final Office Action dated Aug. 18, 2021.
U.S. Appl. No. 16/699,010, Office Action dated Nov. 9, 2022.
U.S. Appl. No. 16/837,182, Final Office Action dated Apr. 27, 2022.
U.S. Appl. No. 16/837,182, Non-Final Office Action dated Sep. 16, 2021.
U.S. Appl. No. 16/848,266, Non Final office Action dated Oct. 13, 2022.
Yoshizaki et al., "Machine Learning Usage Guide by Practical Learning ," Mynavi Publishing Corporation, Naoki Takiguchi, Sep. 20, 2019, vol. 1 (1), pp. 156-165.
U.S. Appl. No. 16/697,620, Advisory action dated May 3, 2024.
U.S. Appl. No. 16/697,620, Notice of allowance dated Apr. 18, 2024.
U.S. Appl. No. 17/993,952, Non Final office action dated May 21, 2024.
U.S. Appl. No. 18/451,755, Non -Final office Action dated Mar. 14, 2024.
U.S. Appl. No. 18/461,608, Non -Final office Action dated Apr. 25, 2024.
U.S. Appl. No. 16/697,620, Notice of Allowance dated Aug. 19, 2024.

* cited by examiner

SYSTEMS AND METHODS FOR DYNAMIC DEMAND SENSING AND FORECAST ADJUSTMENT

CROSS-REFERENCE TO RELATED APPLICATIONS

The present application is a U.S. continuation-in-part patent application of U.S. patent application Ser. No. 18/071,802 filed Nov. 30, 2022, which is a continuation application of U.S. Pat. No. 11,537,825 filed Apr. 1, 2020, which is a continuation-in-part of U.S. Pat. No. 11,526,899 filed on Oct. 11, 2019, and the present application claims priority or benefit under 35 U.S.C. Section 120 or otherwise to U.S. provisional patent application Ser. No. 63/518,713, filed Aug. 10, 2023, each of which is incorporated herein by reference.

BACKGROUND

Both manufacturers and retailers depend on customer demand for their products. Yet there is a lack of inventory management approaches depending on predicted daily demand that is intuitive and interpretable. For example, there is little information on how the demand is influenced by various factors and how predicted demands will affect business metrics.

Given the voluminous amount of data within a supply chain, it is difficult to provide an accurate prediction of sales. Current solutions are referred to the industry concept of "demand sensing". The common metric reported for such solutions are based on the mean absolute percentage error (MAPE) of the predicted sales when compared against the actual sales. Most solutions do provide daily estimates of sales using various factors, but users aren't informed by the solutions in terms of the different impact those factors have on the predicted sales. The MAPE metric is used and reported but doesn't take into consideration the business impact of the modeling error and is unstable when it comes to low volume items.

Furthermore, any model that is used to forecast sales must consider constant changes to factors that affect sales of products. Such changes often vary geographically and temporally.

US 20140156346 discloses methods and systems for facilitating dynamic demand sensing. In some implementations, demand sensing data is received from a consumer device. The demand sensing data is generated while the consumer device is in-store. An information management system is updated with the demand sensing data. Analytics may then be performed on the demand sensing data to generate a demand report displayed at the information management system.

US 20120303411 discloses a system, method and computer program product for demand modeling and prediction in retail categories. The method uses time-series data comprising of unit prices and unit sales for a set of related products. This data is based on a number of reporting periods, and on a number of stores in a market geography. Other relevant data sets that affect retail demand are also used. A demand model for improved accuracy is achieved by: estimating a model for price movements and price dynamics from the time series data of unit-prices in the aggregated sales data; estimating a model for market share of each product in the retail category using the aggregated sales data and integrated additional product attribute data; and, estimating generating a model for an overall market demand in the retail category from the aggregated sales data.

The forecasting of sales must consider real-time changes in relevant factors, both from geographical and temporal perspectives. A forecasting method can be outdated even with a few weeks of its previous forecast, if it is not updated constantly to take into account information that impacts sales. A forecasting method that does not rely on the most up-to-date information, will not provide an accurate forecast. There is a need for developing a dynamic demand sensing system that forecasts demand on a daily basis at a granular level (e.g. single products at single locations).

Demand sensing uses artificial intelligence and machine learning algorithms to capture short-term demand patterns. Demand sensing is a valuable technique in the marketplace for forecasting, however, once a demand sensing machine learning pipeline is in production, changes to the pipeline are difficult and costly to implement.

BRIEF SUMMARY

In one aspect, a computer-implemented method, includes receiving, by a processor, a first forecast request, training, by the processor, a plurality of machine learning forecast models on a first portion of a data set, validating, by the processor, a machine learning forecast model on a second portion of the data set, and retraining, by the processor, the machine learning forecast model on a sum of the first portion and the second portion of the data set, the data set including processed historical data. The computer-implemented method also includes forecasting, by the processor, a forecast based on the first forecast request. The computer-implemented method also includes receiving, by the processor, a subsequent forecast request. The computer-implemented method also includes selecting, by the processor, a machine learning forecast model when i) the data set has been updated by a new class of relevant signal data since a previous forecast request, or ii) the data set has been updated by an amount of new relevant signal data beyond a first threshold since the previous forecast request, or iii) the machine learning forecast model has degraded, and retraining, by the processor, a previously-selected machine learning forecast model when a time interval between successive forecast requests is greater than a second threshold. The computer-implemented method also includes using one of the machine learning forecast model selected by the processor and the previously-selected machine learning forecast model for providing first forecast data for a first forecast window, the first forecast data for one or more store locations, transmitting the first forecast data to a user, receiving first sales data for the one or more store locations for a second time interval, the second time interval subsequent a first time interval, determining an error in the first forecast data based on the first forecast data and the first sales data, removing the error from the first forecast data for forming first adjusted forecast data, the first adjusted forecast data for the one or more store locations, and transmitting the first adjusted forecast data to the user.

The method may also include determining the error in the first forecast data based on the first forecast data and the first sales data including determining the error between the first forecast data for each of the one or more store locations and the first sales data for each of the one or more store locations corresponding thereto.

The method may also include determining the error in the first forecast data based on the first forecast data and the first sales data including determining a percentage error between the first forecast data for each of the one or more store locations and the first sales data for each of the one or more store locations and an average percentage error thereof.

The method may also include removing the error from the first forecast data for forming the first adjusted forecast data including removing the average percentage error from the first forecast data for each of the one or more store locations, the first adjusted forecast data includes first adjusted forecast data for each of the one or more store locations.

The method may further include, collecting second data for a third time interval, the second data including at least the historical data and the first sales data, generating second feature data based on the second data, processing second feature data by the processor for training a machine learning algorithm for forming a second forecast model, using the second forecast model for providing second forecast data for a second forecast window, the second forecast data including second forecast data for the one or more store locations, and transmitting the second forecast data to the user.

The method may further include, receiving second sales data, the second sales data for the one or more store locations during a fourth time interval subsequent the second time interval, determining an error in the first forecast data based on the first forecast data and the second sales data, removing an error from the first forecast data for forming third forecast data, and transmitting the third forecast data to the user.

In one aspect, a non-transitory computer-readable storage medium, the computer-readable storage medium including instructions that when executed by a computer, causes the computer to receive, by a processor, a first forecast request, train, by the processor, a plurality of machine learning forecast models on a first portion of a data set, validate, by the processor, a machine learning forecast model on a second portion of the data set, and retrain, by the processor, the machine learning forecast model on a sum of the first portion and the second portion of the data set, the data set includes processed historical data. The non-transitory computer-readable storage medium further causes the computer to forecast, by the processor, a forecast based on the first forecast request. The non-transitory computer-readable storage medium further causes the computer to receive, by the processor, a subsequent forecast request. The non-transitory computer-readable storage medium further causes the computer to select, by the processor, a machine learning forecast model when i) the data set has been updated by a new class of relevant signal data since a previous forecast request, or ii) the data set has been updated by an amount of new relevant signal data beyond a first threshold since the previous forecast request, or iii) the machine learn forecast model has degraded, and retrain, by the processor, a previously-selected machine learning forecast model when a time interval between successive forecast requests is greater than a second threshold. The non-transitory computer-readable storage medium further causes the computer to use one of the machine learning forecast model selected by the processor and the previously-selected machine learning forecast model for providing first forecast data for a first forecast window, the first forecast data for one or more store locations, transmit the first forecast data to a user, receive first sales data for the one or more store locations for a second time interval, the second time interval subsequent a first time interval, determine an error in the first forecast data based on the first forecast data and the first sales data, remove the error from the first forecast data for forming first adjusted forecast data, the first adjusted forecast data for the one or more store locations, and transmit the first adjusted forecast data to the user.

The computer-readable storage medium may also further cause the computer to determine the error in the first forecast data based on the first forecast data and the first sales data including determining the error between the first forecast data for each of the one or more store locations and the first sales data for each of the one or more store locations corresponding thereto.

The computer-readable storage medium may also further cause the computer to determine the error in the first forecast data based on the first forecast data and the first sales data including determining a percentage error between the first forecast data for each of the one or more store locations and the first sales data for each of the one or more store locations and an average percentage error thereof.

The computer-readable storage medium may also further cause the computer to remove the error from the first forecast data for forming the first adjusted forecast data including removing the average percentage error from the first forecast data for each of the one or more store locations, the first adjusted forecast data includes first adjusted forecast data for each of the one or more store locations.

The computer-readable storage medium may also include instructions that when executed by a computer further causes the computer to collect second data for a third time interval, the second data including at least the historical data and the first sales data, generate second feature data based on the second data, process second feature data by the processor for training a machine learning algorithm for forming a second forecast model, using the second forecast model for providing second forecast data for a second forecast window, the second forecast data include second forecast data for the one or more store locations, and transmit the second forecast data to the user.

The computer-readable storage medium may also include instructions that when executed by a computer further causes the computer to receive second sales data, the second sales data for the one or more store locations during a fourth time interval subsequent the second time interval, determine an error in the first forecast data based on the first forecast data and the second sales data, remove an error from the first forecast data for forming third forecast data, and transmit the third forecast data to the user.

In one aspect, a system includes a processor. The system also includes a memory storing instructions that, when executed by the processor, configure the system to receive, by a processor, a first forecast request, train, by the processor, a plurality of machine learning forecast models on a first portion of a data set, validate, by the processor, a machine learning forecast model on a second portion of the data set, and retrain, by the processor, the machine learning forecast model on a sum of the first portion and the second portion of the data set, the data set includes processed historical data. The system is also configured to forecast, by the processor, a forecast based on the first forecast request. The system is also configured to receive, by the processor, a subsequent forecast request. The system is also configured to select, by the processor, a machine learning forecast model when i) the data set has been updated by a new class of relevant signal data since a previous forecast request; or ii) the data set has been updated by an amount of new relevant signal data beyond a first threshold since the previous forecast request; or iii) the machine learn forecast model has degraded, and retrain, by the processor, a previously-selected machine learning forecast model when a time interval between successive forecast requests is greater than a second threshold. The system is also configured to use one of the machine learn forecast model selected by the processor and the previously-selected machine learning forecast model for providing first forecast data for a first forecast window, the first forecast data for one or more store locations. The system is also configured to transmit the first forecast data to a user. The system is also configured to receive first sales data for the one or more store locations for a second time interval, the second time interval subsequent a first time interval. The system is also configured to determine an error in the first forecast data based on the first forecast data and the first sales data. The system is also configured to remove the error from the first forecast data for forming first adjusted forecast data, the first adjusted forecast data for the one or more store locations. The system is also configured to transmit the first adjusted forecast data to the user.

The system may also be configured where determining the error in the first forecast data based on the first forecast data and the first sales data includes determining the error between the first forecast data for each of the one or more store locations and the first sales data for each of the one or more store locations corresponding thereto.

The system may also be configured where determining the error in the first forecast data based on the first forecast data and the first sales data includes determining a percentage error between the first forecast data for each of the one or more store locations and the first sales data for each of the one or more store locations and an average percentage error thereof.

The system may also be further configured to collect second data for a third time interval, the second data including at least the historical data and the first sales data, generate second feature data based on the second data, process second feature data by the processor for training a machine learning algorithm for forming a second forecast model, using the second forecast model for providing second forecast data for a second forecast window, the second forecast data include second forecast data for the one or more store locations, and transmit the second forecast data to the user.

The system may also be further configured to receive second sales data, the second sales data for the one or more store locations during a fourth time interval subsequent the second time interval, determine an error in the first forecast data based on the first forecast data and the second sales data, remove an error from the first forecast data for forming third forecast data, and transmit the third forecast data to the user.

The system may also be configured where removing the error from the first forecast data for forming the first adjusted forecast data includes removing the average percentage error from the first forecast data for each of the one or more store locations, the first adjusted forecast data includes first adjusted forecast data for each of the one or more store locations.

Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
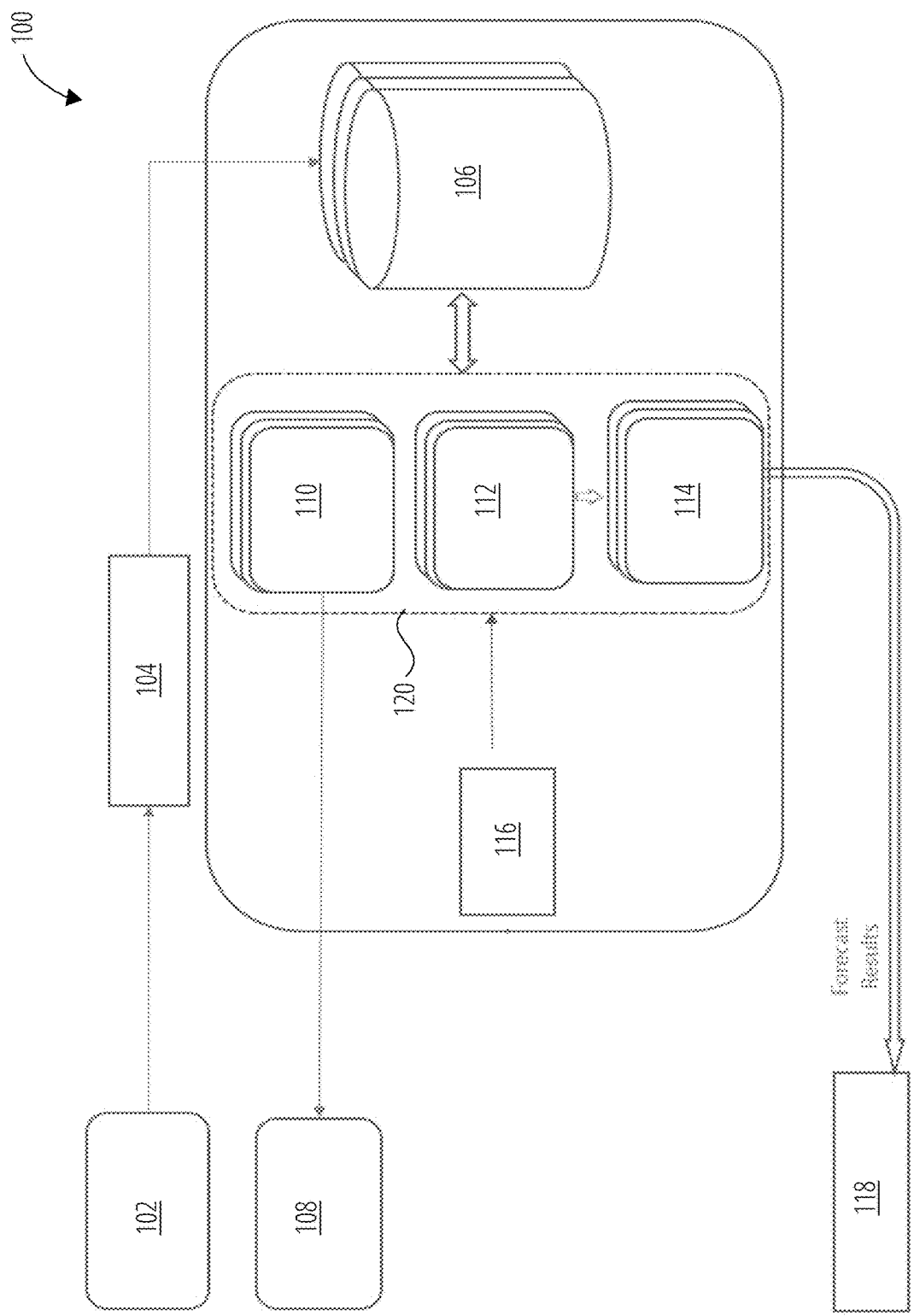
FIG. 1 illustrates a system architecture in accordance with one embodiment.

The demand sensing method can provide predicted daily sales for a single products (for example, according to their stock keeping unit (SKU) identification codes) for single locations (e.g. retail stores) over some horizon (e.g. 13 weeks ahead) for a variety of purposes, including: allowance by the user to use the predictions to drive replenishment orders at the defined locations; and gaining an analytical understanding of the factors driving the predicted sales in order to plan for the future.

The data processing services are composed of various components of a machine learning pipeline. Per user request, features may be generated from the raw user-specific and public datasets. Then one or more quantile regression models can be trained with these features. Selection of features and hyperparameters can be achieved through the evaluation of each model on the same validation set. The evaluation comprises managing a simulated inventory for the period of time equivalent to the validation set, where orders are given based on simple heuristics and key performance metrics are measured, such as excessive inventory over a period of time and number of stock out days. Once a model is chosen (for best performance for an item and store combination), the contribution of each feature (on the demand predictions) may be evaluated through model interpretation techniques (e.g. SHapley Additive exPlantions). In a last step, data related to predictions, prediction quality, and prediction contributions may be gathered and illustrated to the user by a number of interactive visualizations that are found in user-application interfaces mentioned above.

Historical data may be collected from a variety of sources. For example, data may be collected from a client/user that includes historical plus forwarding looking data such as campaigns. In some embodiments, historical client data can include point-of-sales data that provides information on the amount of product sold at a particular day at a particular location; and inventory of a particular product at a particular location. Other types of data can be mined from the web and social media, such as weather data, financial markets, and the like. Calendar data that includes local holidays, along with local event data may also be collected. Promotion campaign details for a particular product at a particular location can also be included, and other relevant events. In summary, any information that relates to, or impacts upon, the sales of a particular product at a particular location, can be used as part of the input dataset.

The raw data is first processed, before being used by machine learning models. In some embodiments, that can entail features generation (which is fed into the various models of the Machine Learning Module).

In some embodiments, the data is partitioned into a training portion and a validation portion. Each model may be trained on the training portion. Each trained model is then tested on the remaining validation portion of the data, and the model that provides the best prediction on the validation portion of the data, is selected. The selected machine learning model can be retrained on the entire data set, and then used for deployment on live data.

In some embodiments, the data is partitioned into a training portion, a validation portion and a testing portion. Each model may be trained on the training portion. Each trained model is then tested on the validation portion of the data, and the model that provides the best prediction on the validation portion of the data, is selected. The selected machine learning model can be retrained on the first two portions (i.e. data from both the training and validation portions). It can then be tested on the testing portion to provide a measure of accuracy for the user. The selected model may then be used for deployment on live data.

The machine learning models are trained and validated on data pertaining to a particular product at a particular location, in order to provide forecasting for that product at that location. Forecasting by the selected trained model can be for a selected time frame. In some embodiments, that time frame is a 13-week horizon. The "live" input data used for forecasting can include sales data from a previous time period (e.g. sales from 1 month, or 2 months, or 3 months ago, or more); promotion campaigns, weather data for the location and in the vicinity of the location, market indexes for the location and in the vicinity of the location; and events at or in the vicinity of the location.

FIG. 1 illustrates a system architecture 100 in accordance with one embodiment.

Client data source 102 provides a variety of raw data from the user, including, but not limited to: point of sales data that indicates the sales record of all of the client's products at every location; the inventory history of all of the client's products at every location; promotional campaign details for all products at all locations, and events that are important/relevant for sales of a client's product at every location.

Ingestion module 302 receives client data source 102 and converts it into a different format that is ready for storage in ML storage 106.

Dynamic demand sensing module 120 comprises three modules: external data module 110; monitor module 112 and forecasting module 114, each of which is described below.

External data module 110 obtains external data from external data source(s) 108 and prepares it for storage in ML storage 106. External data can be mined from the web and social media, and can include information such as weather data, financial market data, and the like. for a plurality of locations. These locations can include locations that are important to the client's product sales. Furthermore, market indicines may be wider than the actual location(s) required by the client, as market indices are often nation-wide, whereas locations can be confined to smaller geographical areas such as cities or towns. Calendar data that includes local holidays, along with local event data can also be included. In some embodiments, external data module 110 can be on a schedule to obtain external data from external data source(s) 108 (e.g. on a daily, semi-daily, weekly, bi-weekly, monthly, etc. schedule). External data module 110 can access different types of data, each on its own schedule. For example, weather data can be accessed on a daily basis; market data can be accessed daily or weekly, calendar data can be accessed yearly, etc.

Request module 116 provides a request to the monitor module 112, to provide a forecast for a subset of the data stored in ML storage 106. In some embodiments, request module 116 may request the forecasting of a particular product at a particular store (or location) for a forecasting horizon time period.

Monitor module 112 obtains information provided by request module 116 as to which subset of products/stores are to be forecasted. Based on information related to the subset and information related to the ML storage 106, the monitor module 112 decides on how the subset will be forecast, based on a set of rules, described below. Once the subset is ready for forecasting, forecasting module 114 provides a forecast that is output to output 118.

Figure 2:
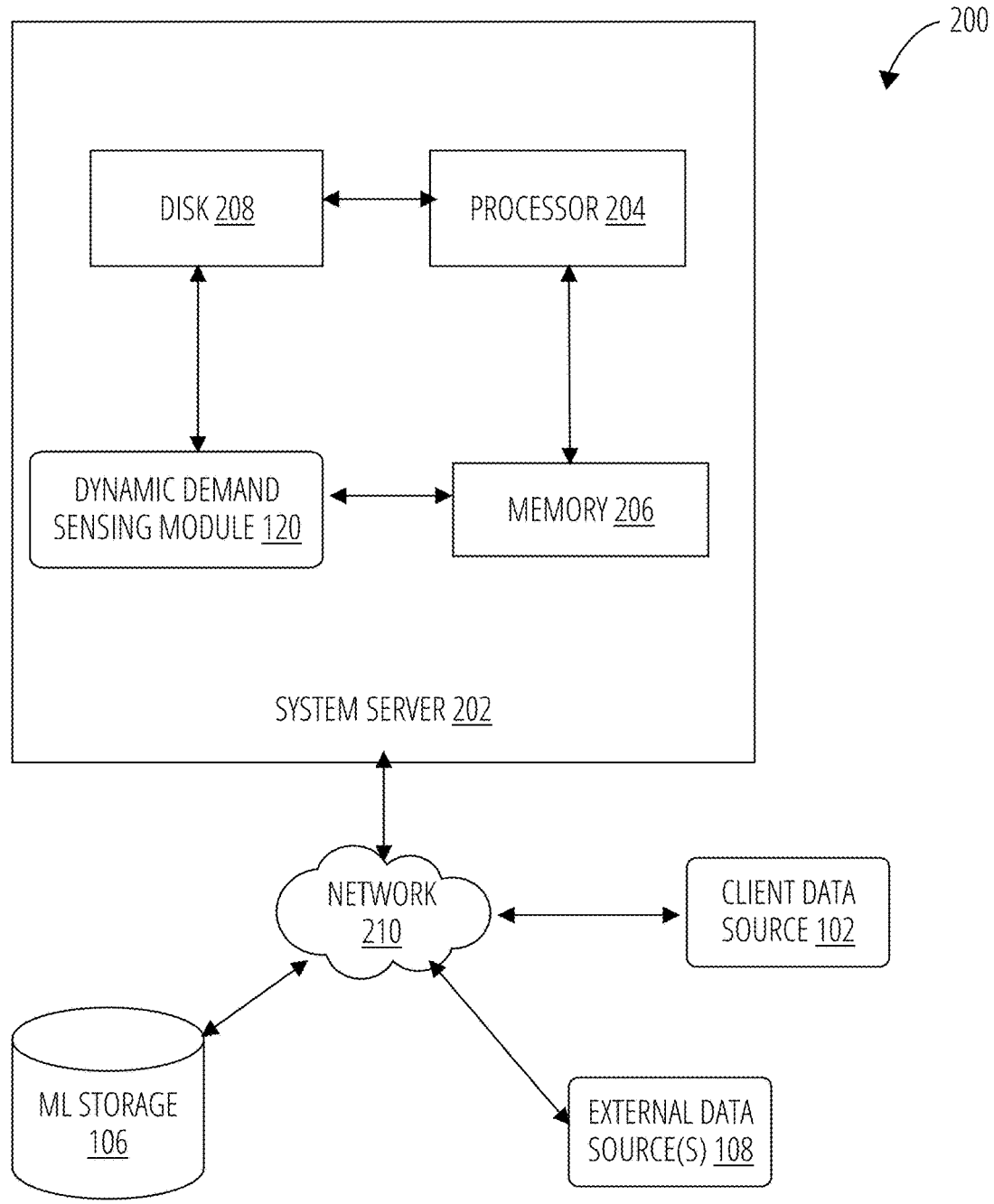
FIG. 2 illustrates a block diagram in accordance with one embodiment.

FIG. 2 illustrates a system 200 in accordance with one embodiment of a dynamic demand sensing system.

System 200 includes a system server 202, ML storage 106, client data source 102 and external data source(s) 108. System server 202 can include a memory 206, a disk 208, a processor 204 and a dynamic demand sensing module 120. While one processor 204 is shown, the system server 202 can comprise one or more processors. In some embodiments, memory 206 can be volatile memory, compared with disk 208 which can be non-volatile memory. In some embodiments, system server 202 can communicate with ML storage 106, external data source(s) 108 and client data source 102 via network 210. While ML storage 106 is illustrated as separate from system server 202, ML storage 106 can also be integrated into system server 202, either as a separate component within system server 202, or as part of at least one of memory 206 and disk 208.

System 200 can also include additional features and/or functionality. For example, system 200 can also include additional storage (removable and/or non-removable) including, but not limited to, magnetic or optical disks or tape. Such additional storage is illustrated in FIG. 2 by memory 206 and disk 208. Storage media can include volatile and nonvolatile, removable and non-removable media implemented in any method or technology for storage of information such as computer-readable instructions, data structures, program modules or other data. Memory 206 and disk 208 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 200. Any such non-transitory computer-readable storage media can be part of system 200. Communication between system server 202, client data source 102, ML storage 106 and external data source(s) 108 via network 210 can be over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). Generally, communication between various components of system 200 may take place over hard-wired, cellular, Wi-Fi or Bluetooth networked components or the like. In some embodiments, one or more electronic devices of system 200 may include cloud-based features, such as cloud-based memory storage.

ML storage 106 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database.

ML storage 106 may store metadata regarding the structure, relationships and meaning of data. This information may include data defining the schema of database tables stored within the data. A database table schema may specify the name of the database table, columns of the database table, the data type associated with each column, and other information associated with the database table. ML storage 106 may also or alternatively support multi-tenancy by providing multiple logical database systems which are programmatically isolated from one another. Moreover, the data may be indexed and/or selectively replicated in an index to allow fast searching and retrieval thereof. In addition, ML storage 106 can store a number of machine learning models that are accessed by the dynamic demand sensing module 120. A number of ML models, such as gradient-boosted trees, ensemble of trees and support vector regression, can be used.

External data source(s) 108 may include sources that provide both historical and real-time information about climate, weather, financial indexes, web data, social media data, local holidays, festivals and events, and the like. Commercial weather and financial services can be purchased or accessed by other means.

Client data source 102 may provide a variety of raw data from the user, including, but not limited to: point of sales data that indicates the sales record of all of the client's products at every location; the inventory history of all of the client's products at every location; promotional campaign details for all products at all locations, and events that are important/relevant for sales of a client's product at every location.

Using network 210, system server 202 can retrieve data from ML storage 106, 102 and external data source(s) 108. The retrieved data can be saved in memory 206 or disk 208.

In some cases, system server 202 can also comprise a web server, and can format resources into a format suitable to be displayed on a web browser.

Figure 3:
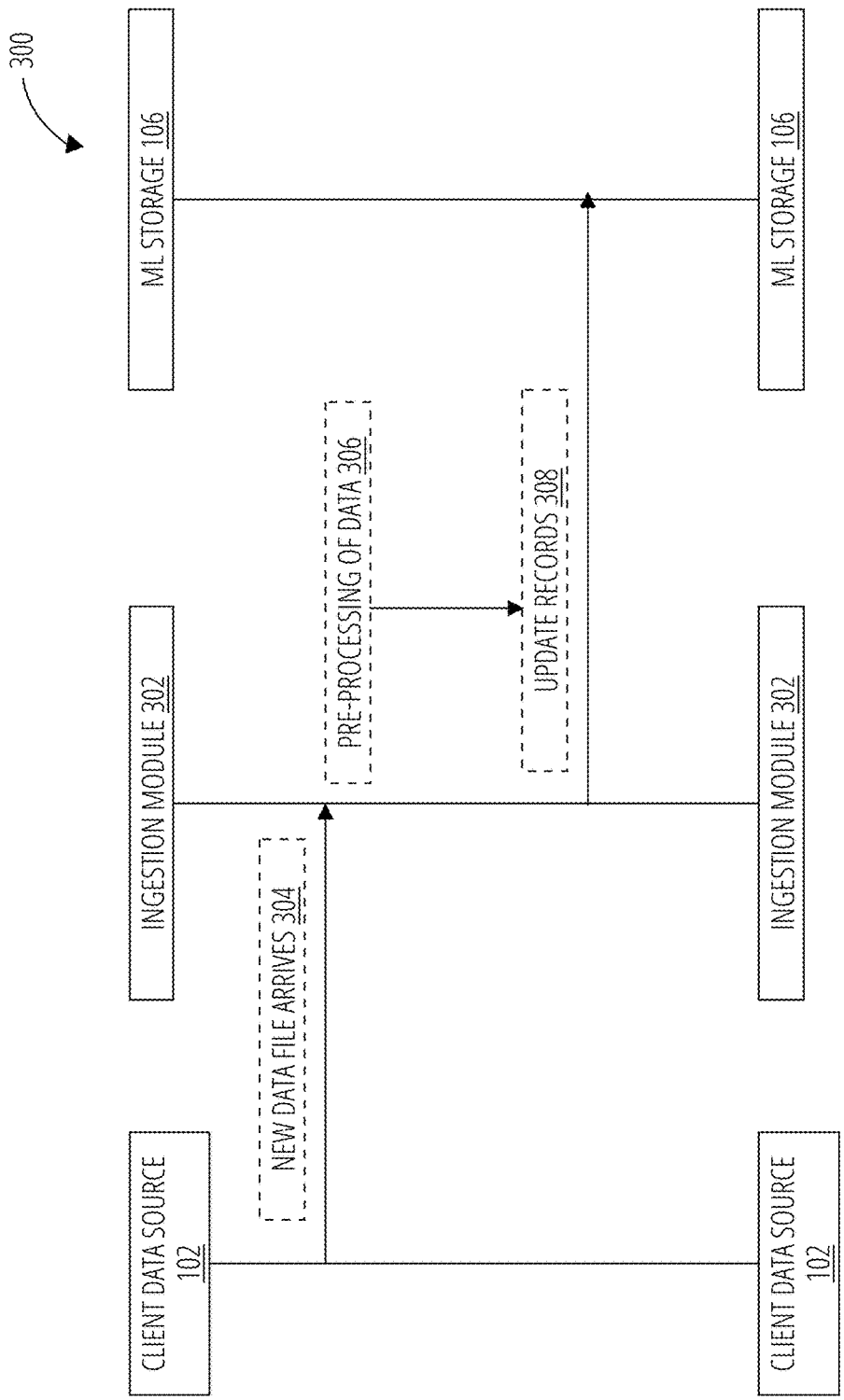
FIG. 3 illustrates a flowchart for an ingestion module in accordance with one embodiment.

FIG. 3 illustrates a flowchart 300 for an ingestion module 302 in accordance with one embodiment.

Ingestion module 302 receives data from client data source 102 at block 304, and proceeds to pre-process the data at block 306. Pre-processing may include transformation, validation, remediation, or any combination thereof, of the data.

Validation of the data simple means to determine whether there are potential errors in the incoming data. For example, validation can include identification of missing data, null data, differences in row counts and data mismatches. In some embodiments, data validation module may use a machine learning algorithm in conjunction with a z-score threshold value to identify anomalous data values.

Data remediation involves remediation or re-calculation of data that is indicative of an error. For example: missing or erroneous values may be replaced using data that is interpolated from an existing value or values, an average of existing data or a mean of existing data. In some embodiments, remediation of data can use a predictive model to replace data that is indicative of error.

Figure 4:
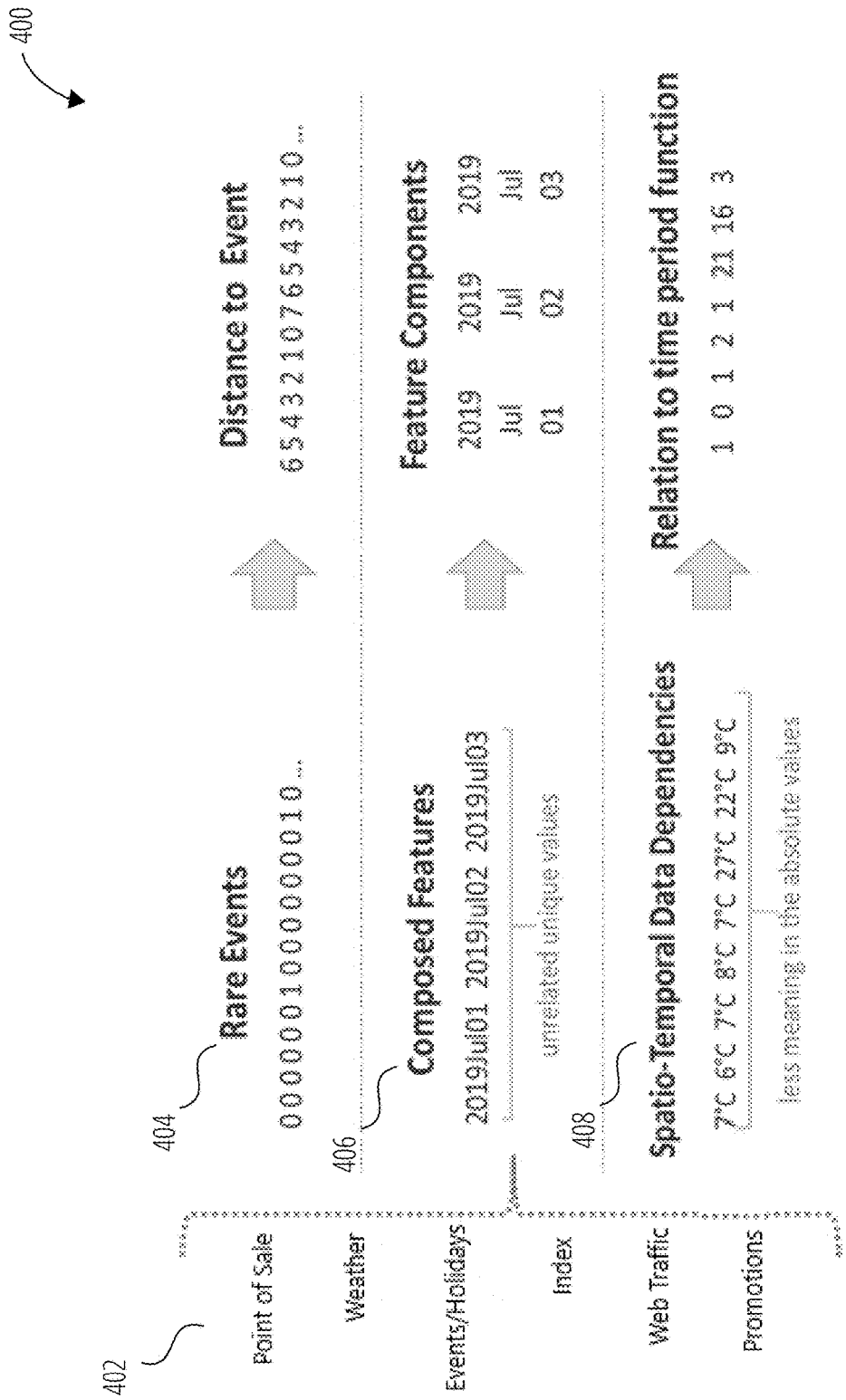
FIG. 4 illustrates a transformation examples in accordance with one embodiment.

Transformation examples are illustrated in FIG. 4 and described below.

The pre-processed data is used to update data at block 308, for storage in the ML storage 106.

FIG. 4 illustrates a transformation examples 400 in accordance with one embodiment. Examples of features 402 can include data related to: point of sales, weather, events/holidays, market index, web traffic and promotions. Features 402 may include additional categories of data, fewer, or different categories than those shown in FIG. 4.

Example 1 404, shows how data related to a rare event, which is in binary form, is transformed to a form that includes integers, by specifying the number of days to the event. For example, the rare event can have the value '0' to indicate the day a store is open (e.g. Mon-Sat) and '1' to indicate the day a store is closed (e.g. Sunday). The series of '0's and '1's is transformed, instead, to a series of integers that indicate how many days away that a given day is to the rare event.

Example 2 406 shows an example of transforming consecutive dates to a tabular form that lists year (in one row); month (in a second row) and date (in the third row).

Example 3 408 shows an example of transforming temperature values on certain dates, to temperature values in relation to the lowest temperature reading (6° C.). The original 6° C. reading is transformed to '0'; 7° C. to '1'; 8° C. to '2', and so forth. Graphical representations of transformations are discussed below.

Figure 5:
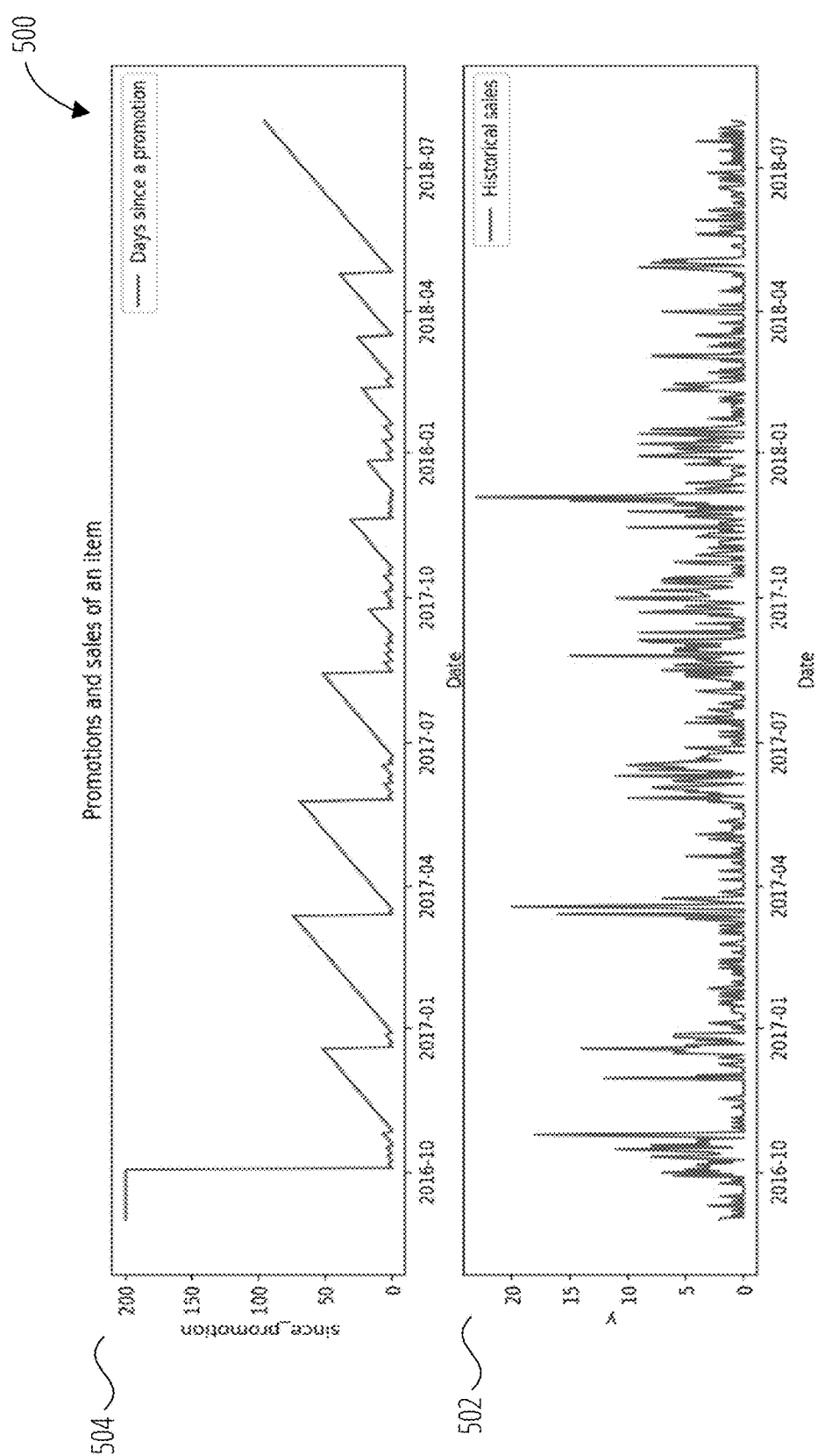
FIG. 5 illustrates a transformation examples in accordance with one embodiment.

FIG. 5 illustrates further transformation examples 500 in accordance with one embodiment.

Promotion transformation 504 can be graphically represented as the number of days after a promotion. rather than the actual day of the promotion. For comparison, sales of an item 502 is shown next to sales promotion transformation 504. Preliminary analysis shows that there was a spike in sales shortly after a promotion in October 2016 and April 2017.

Figure 6:
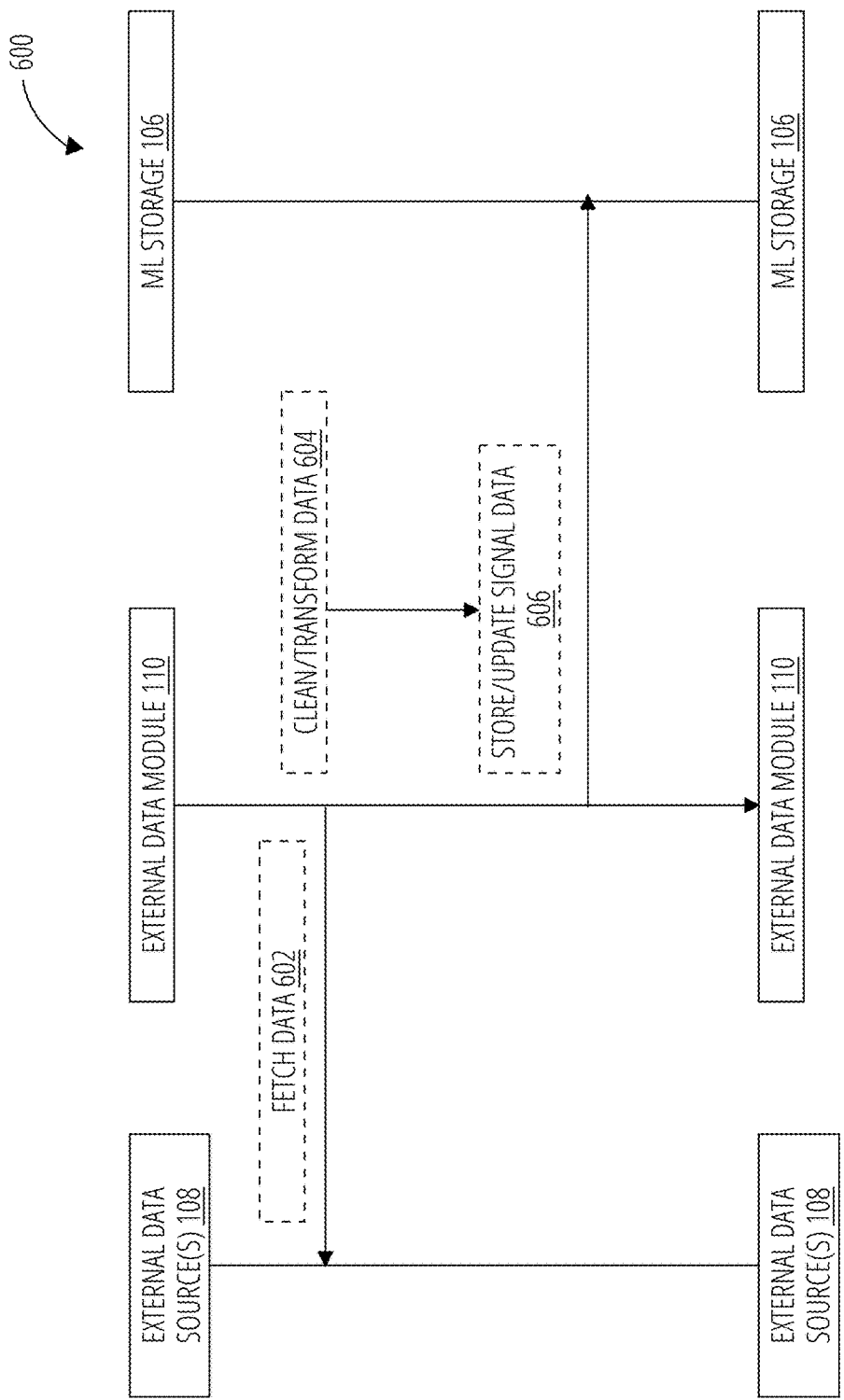
FIG. 6 illustrates a flowchart for an external data module in accordance with one embodiment.

FIG. 6 illustrates a flowchart 600 for an external data module 110 in accordance with one embodiment.

External data module 110 fetches data (at block 602) from external data source(s) 108 which can include raw data about weather, market indices, trends, etc. The external data source(s) 108 provide data that complements client data source 102 (of FIG. 1). The raw data is cleaned (or validated) to remove outliers, and transformed (at block 604) for storage, at block 606, in the ML storage 106.

Pre-processing may include transformation, validation, remediation, or any combination thereof, of the data.

Validation of the data simple means to determine whether there are potential errors in the incoming data. For example, validation can include identification of missing data, null data, differences in row counts and data mismatches. In some embodiments, data validation module may use a machine learning algorithm in conjunction with a z-score threshold value to identify anomalous data values.

Data remediation involves remediation or re-calculation of data that is indicative of an error. For example: missing or erroneous values may be replaced using data that is interpolated from an existing value or values, an average of existing data or a mean of existing data. In some embodiments, remediation of data can use a predictive model to replace data that is indicative of error.

Examples of transformation of external data are discussed with reference to FIG. 7.

The pre-processed external data is used to update data at block 308, for storage in the ML storage 106.

Figure 7:
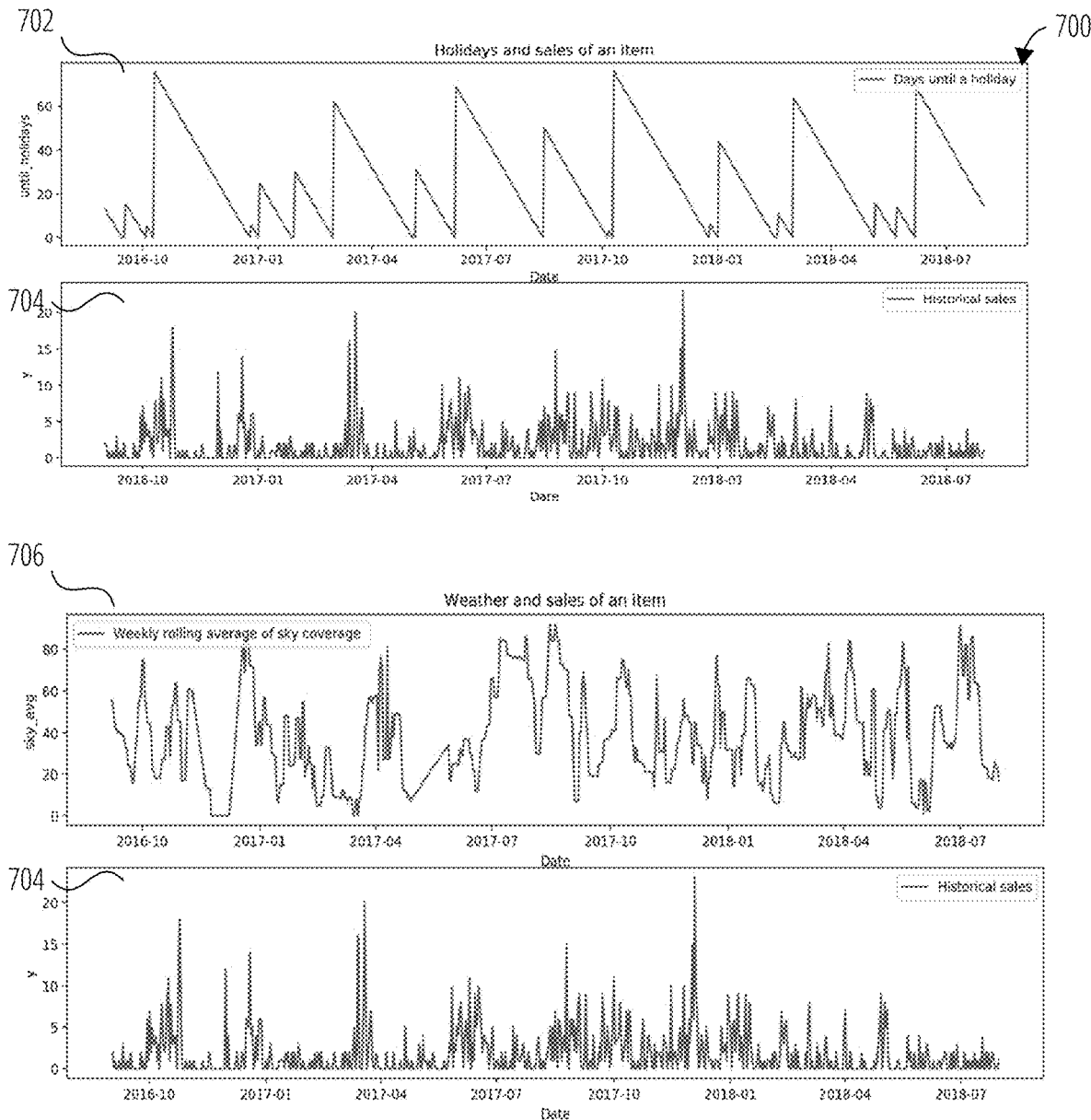
FIG. 7 illustrates a transformation examples in accordance with one embodiment.

FIG. 7 illustrates further transformation examples 700 of external data in accordance with one embodiment.

Examples of external data include calendar dates, such as holidays, and weather data.

Holidays transformation 702 can be graphically represented as the number of days until a holiday, rather than the actual day of the holiday. For comparison, sales of an item 704 is shown next to holidays transformation 702. Preliminary analysis suggests that there was a spike in sales shortly after a holiday in October 2016 and April 2017.

Weather transformation 706 can be graphically represented as a weekly rolling average of sky coverage over an area where the item is sold. For comparison, sales of an item 704 is shown next to holidays transformation 702.

Figure 8:
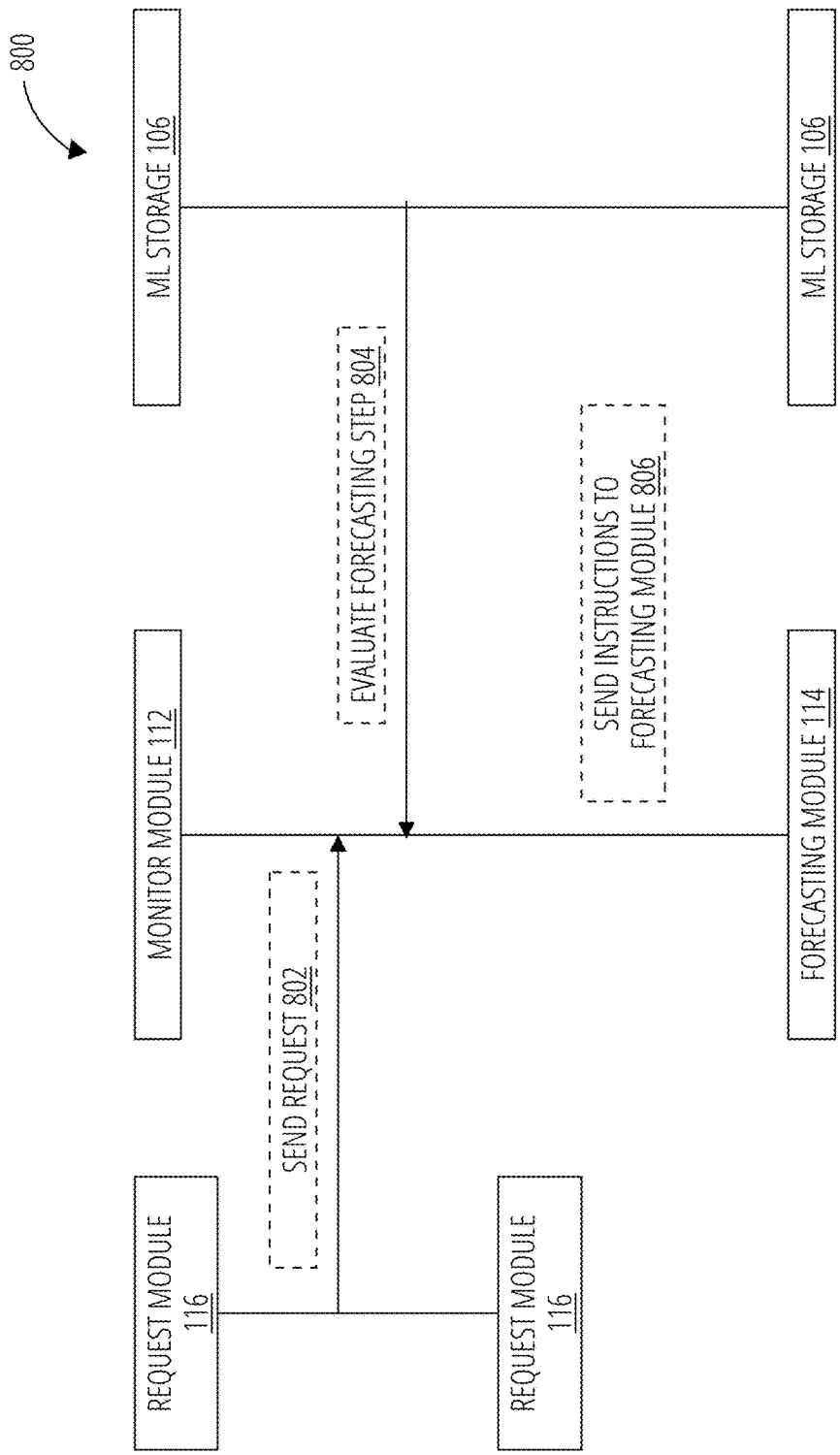
FIG. 8 illustrates a flowchart for a monitor module in accordance with one embodiment.

FIG. 8 illustrates a flowchart 800 for a monitor module 112 in accordance with one embodiment.

Monitor module 112 receives a request for a forecast (at block 802) from request module 116. Based on the specific information associated with the request, monitor module 112 evaluates the forecasting step (at block 804) based on the data and machine learning metrics, all stored in ML storage 106. Details of this evaluation are described below. Once the forecasting step is evaluated, instructions are sent to the forecasting module 114 (at block 806).

Figure 9:
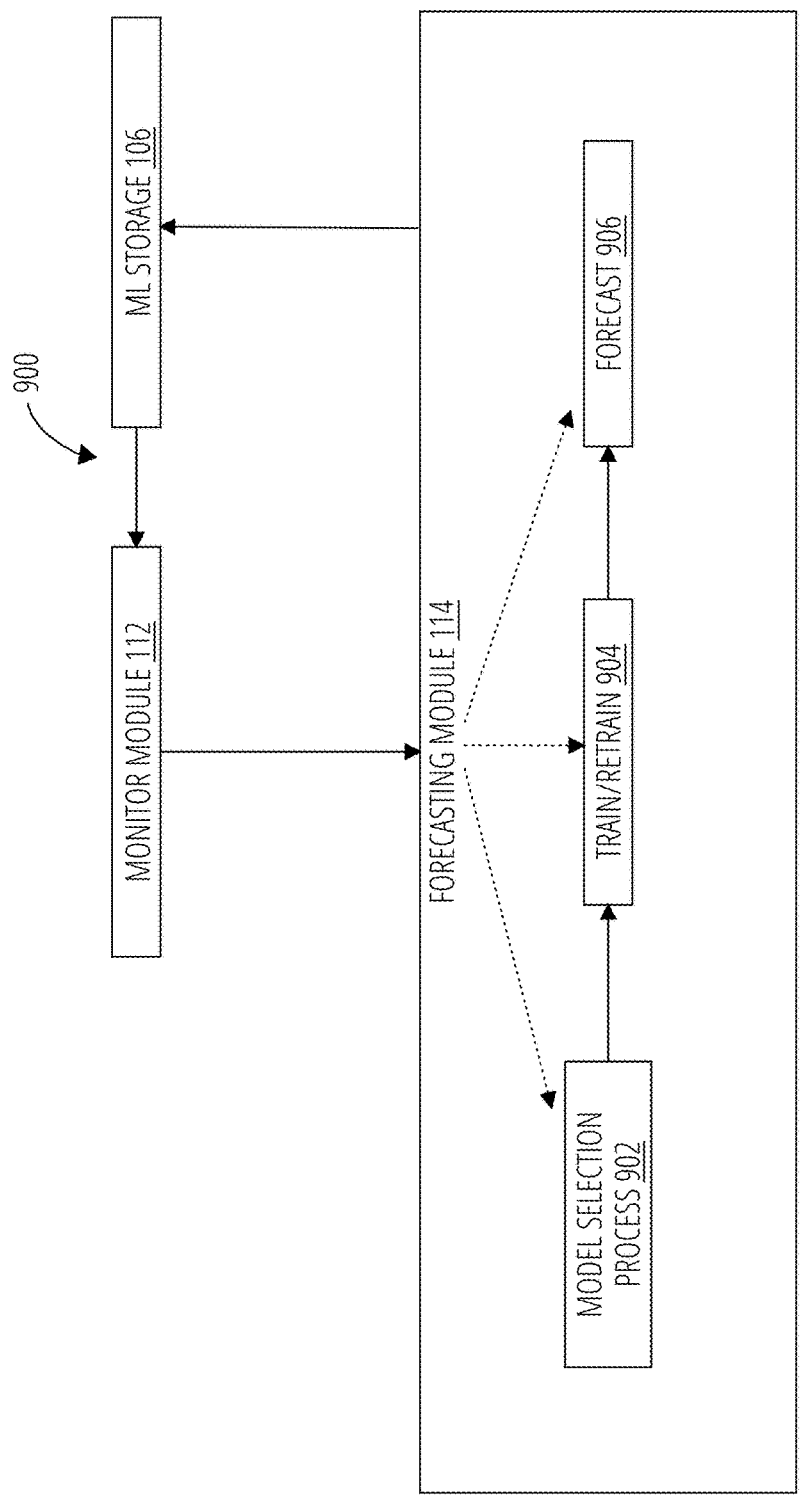
FIG. 9 illustrates a flowchart for a forecasting module in accordance with one embodiment.

FIG. 9 illustrates a flowchart 900 for a forecasting module in accordance with one embodiment.

Monitor module 112 evaluates a forecast request from request module 116, in view of data and machine learning model metrics stored in ML storage 106. Instructions are sent to the forecasting module 114 to initiate one of three task sequences. A first task sequence comprises: forecasting module 114 will select a machine learning model at block 902, followed by training the selected model at block 904, followed by forecasting with the trained model at block 906, for a specified future period of time.

A second, different task sequence comprises: training a selected model at block 904, followed by forecasting with the trained model at block 906, for a specified future period of time.

A third, different task sequence simply comprises forecasting with a selected, trained model at block 906, for a specified future period of time.

All results produced by forecasting module 114 are stored in ML storage 106. In some embodiments, this includes the selected, trained model and all of the features and hyperparameters associated thereof, along with the forecast results.

Since ML storage 106 is updated dynamically with external data and user data, the forecast results produced by forecasting module 114 can be evaluated by comparing with actual updated data. In some embodiments, the evaluation of forecasted results is performed by monitor module 112 and used as part of the evaluating the forecasting step (block 804) in FIG. 8.

Figure 10:
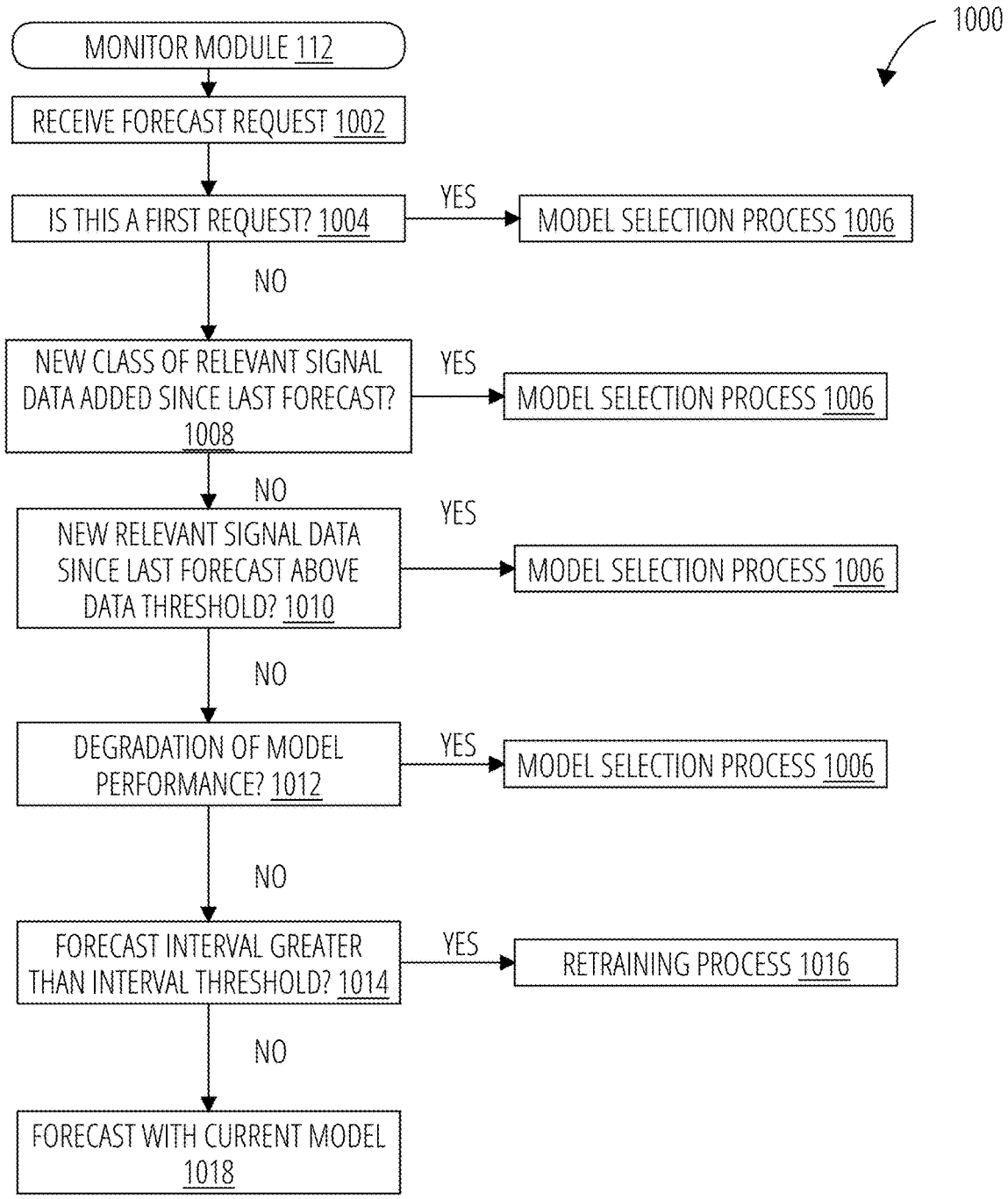
FIG. 10 illustrates a flowchart of a forecast request evaluation by a monitor module in accordance with one embodiment.

FIG. 10 illustrates a flowchart of a forecast request evaluation by a monitor module 112 in accordance with one embodiment.

Monitor module 112 receives a request for a forecast at block 1002. For example, this can be a request to forecast the demand of a certain client product at a particular location over a specific time period. As an example, this may be a request to forecast the demand of a particular make of a vacuum cleaner at a specific retail store in Kanata, Ontario, for a period of 13 weeks.

Monitor module 112 checks with the ML storage 106 to see if this is first time a forecasting request for this particular product and location is made, at block 1004. If it is, then monitor module 112 flags the request to undergo a full model selection process at block 1006, which is subsequently sent to forecasting module 114 (see FIG. 9). Embodiments of the full model selection process are described below.

If this is not the first time a forecasting request for this particular product and location is made, then monitor module 112 checks the ML storage 106 to see if any new class of relevant signal data has been added since the last forecast request for the particular product and location, at block 1008. If the answer is yes, then monitor module 112 flags the request to undergo a full model selection process at block 1006, which is subsequently sent to forecasting module 114 (see FIG. 9).

As an example, in the intervening period between the first request and the subsequent request, ML storage 106 may have received weather data that includes a humidity index relevant to the location of the request, which was not present in the data used for the initial forecast. The humidity index is a new class of signal data that can be used in the machine learning forecasting of the particular product at the particular location. Note that if new humidity data has been received during the intervening period, but the new humidity data has no impact on the location of interest, then it is not considered as being relevant. For example, if ML storage 106 receives the humidity index for Washington, D.C., but not for Kanata ON (where the forecast is requested), then this is not considered as a relevant new class of signal data.

If the answer at block 1008 is no, monitor module 112 checks to see if the amount of new relevant data stored in ML storage 106 since the last forecast, is above a certain threshold at block 1010. If yes, then monitor module 112 flags the request to undergo a full model selection process at ML storage 106, which is subsequently sent to forecasting module 114 (see FIG. 9). Again, a comparison is made with regards to data that is relevant to the forecasting request in question.

As an example, ML storage 106 receives user data and external data on an on-going basis. During an intervening period between forecast requests, the amount of new signal data accumulates, and can be quantified such that the amount of new data is a percentage of the amount of data used for the previous forecast. In some embodiments, the minimum threshold may be 15% to 30%, or 15% or 20% or 25% or 30%, of the amount of data used for the previous forecast.

If the answer at block 1010 is no, monitor module 112 proceeds to block 1012 to evaluate the performance of the machine learning model used in the previous forecast. With reference to FIG. 9, once the forecasting module 114 provides a forecast, the forecast is stored in the ML storage 106. Monitor module 112 evaluates the forecast on an ongoing basis by comparing the forecasted values with the actual values as the latter are uploaded to ML storage 106 on an ongoing basis. Evaluation methods known in the art may be used to evaluate the accuracy of the forecasted values, and a criterion may be selected to determine whether or not the forecast remains viable. In some embodiments, the evaluation method can be selected from mean absolute percentage error (MAPE); mean absolute scaled error (MASE), mean absolute error (MAE), and Weighted Mean Absolute Percentage Error (WMAPE). If the forecast is not deemed viable, then monitor module 112 flags the request to undergo a full model selection process at block 1006, which is subsequently sent to forecasting module 114 (see FIG. 9).

If the answer at block 1012 is no, monitor module 112 proceeds to block 1012 to evaluate the time interval between the previous and current forecasting requests at block 1014. If the time interval is beyond a certain threshold, then monitor module 112 flags the request to have the current model retrained at block 1010, which is subsequently sent to forecasting module 114 (see FIG. 9). The time interval threshold may be any value. In some embodiments, the time threshold value may be a few months or more. In some embodiments, the time threshold may be 2 to 8 months, or 3 to 6 months, or 2 months, or 3 months, or 6 months. Retraining of the selected model may comprise retraining on the initial data set along with the data that has accumulated in the intervening time period.

If the time threshold is surpassed, all of the signal data gathered from the user and external data sources during the intervening period between successive forecasting requests is used to retrain the current model. Embodiments of retraining are described below.

If the time threshold is not surpassed, monitor module 112 proceeds to instruct forecasting module 114 to forecast using the current model at block 1018, without any retraining.

Figure 11:
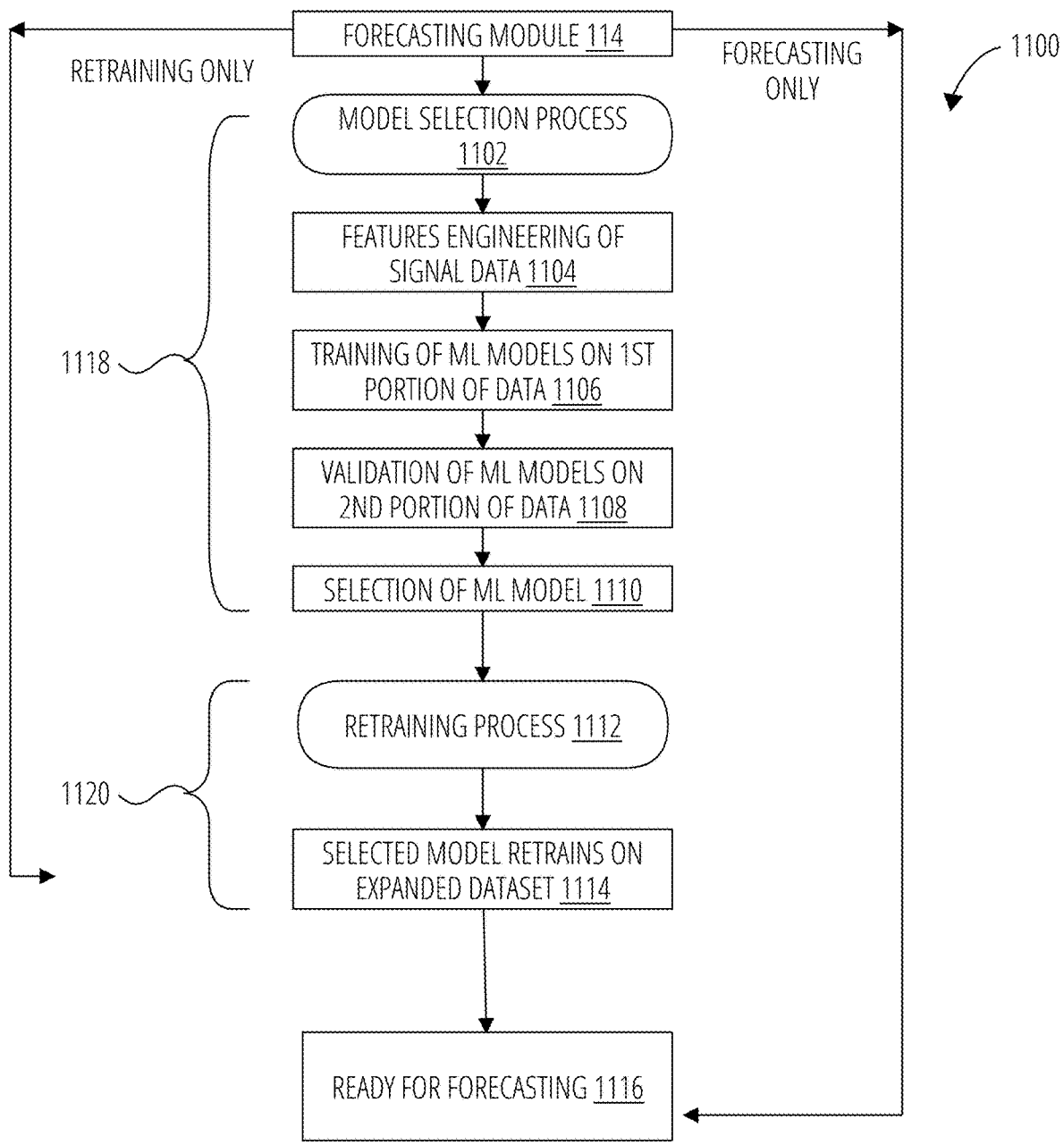
FIG. 11 illustrates a flow chart of a forecasting module in accordance with one embodiment.

FIG. 11 illustrates a flow chart 1100 of a forecasting module 114 in accordance with one embodiment.

Forecasting module 114 receives instructions from monitor module 112, as shown in FIG. 9, to either select a model (block 902), train/retrain (block 904), or forecast (block 906). In FIG. 11, block series 1118 describes a flowchart of the model selection process 1102 in an embodiment; block series 1120 describes a flowchart of the training process 1112 in an embodiment, and block 1116 refers to the forecasting of the trained ML model.

When forecasting module 114 is instructed to conduct a model selection process 1102 by monitor module 112, a first step is to engineer features of signal data (retrieved from ML storage 106) at step block 1104. Features engineering may be automated in the sense that the system can generate features more amenable to machine learning without having a user define one or more transformations of the features engineering process. In some embodiments, selection of transformations may be achieved automatically through methods like cross-validation, dimensionality reduction and independence criteria tests.

The timeframe of signals data used at block 1104 varies, depending on where in flowchart 1000 (of FIG. 10) the model selection process occurs. For example, if the model selection process is selected at block 1006 (i.e. performing a forecast for the first time), then all of the relevant signal data (from the user and external data sources) collected up to the time of receiving the first forecast request, is used. For example, if the model selection process is selected at block 1006 (i.e. performing a subsequent forecast), then all of the relevant signal data (from the user and external data sources) collected up to the time of receiving the subsequent request, is used.

Once the features engineering data is prepared, it is used to train, validate and optionally test. In some embodiments, the engineered data is divided chronologically into two portions: a training portion and a validation portion. Forecasting module 114 obtains access to a plurality of ML models in ML storage 106; each of the ML models is trained on the training portion at block 1106. Each trained ML model then provides a prediction for the time period corresponding to the validation portion at block 1108. Each forecast is evaluated for accuracy, and the most accurate model is selected for further forecasting at block 1110.

In some embodiments, the training portion may be between 50%-80% of the full engineered dataset; the validation portion may be between 20%-50%%, such that the overall total is 100%. In some embodiments, the training/validation portions may be 60%/40%%, or 80%/20% or 70%/30%. Different validation schemes, known in the art, may be used. Examples include nested cross-validation comprising an outer loop and inner loop (for tuning hyperparameters). As an example, validation may be performed over many windows of the training data, rather than one single window.

Retraining of a selected ML model is described in block series 1120, in accordance with one embodiment. A selected ML model is first retrained on an expanded dataset at block 1114. Details of the training/retraining vary slightly, depending on where in the overall process of FIG. the selected model is being trained—within a model selection process (i.e. in block 1006); or within a retraining process alone (i.e. Block 1016).

Where retraining of the selected ML model is part of a model selection process 1102, the selected ML model is retrained on an expanded engineered data set comprising data corresponding to the training and validation portions of the dataset (at block 1114).

Where retraining of the selected ML model occurs without model selection process 1102 (i.e. retraining only), the selected ML model is retrained on an expanded engineered data set comprising data corresponding to the training and validation portions of the dataset (at block 1114).

Figure 12:
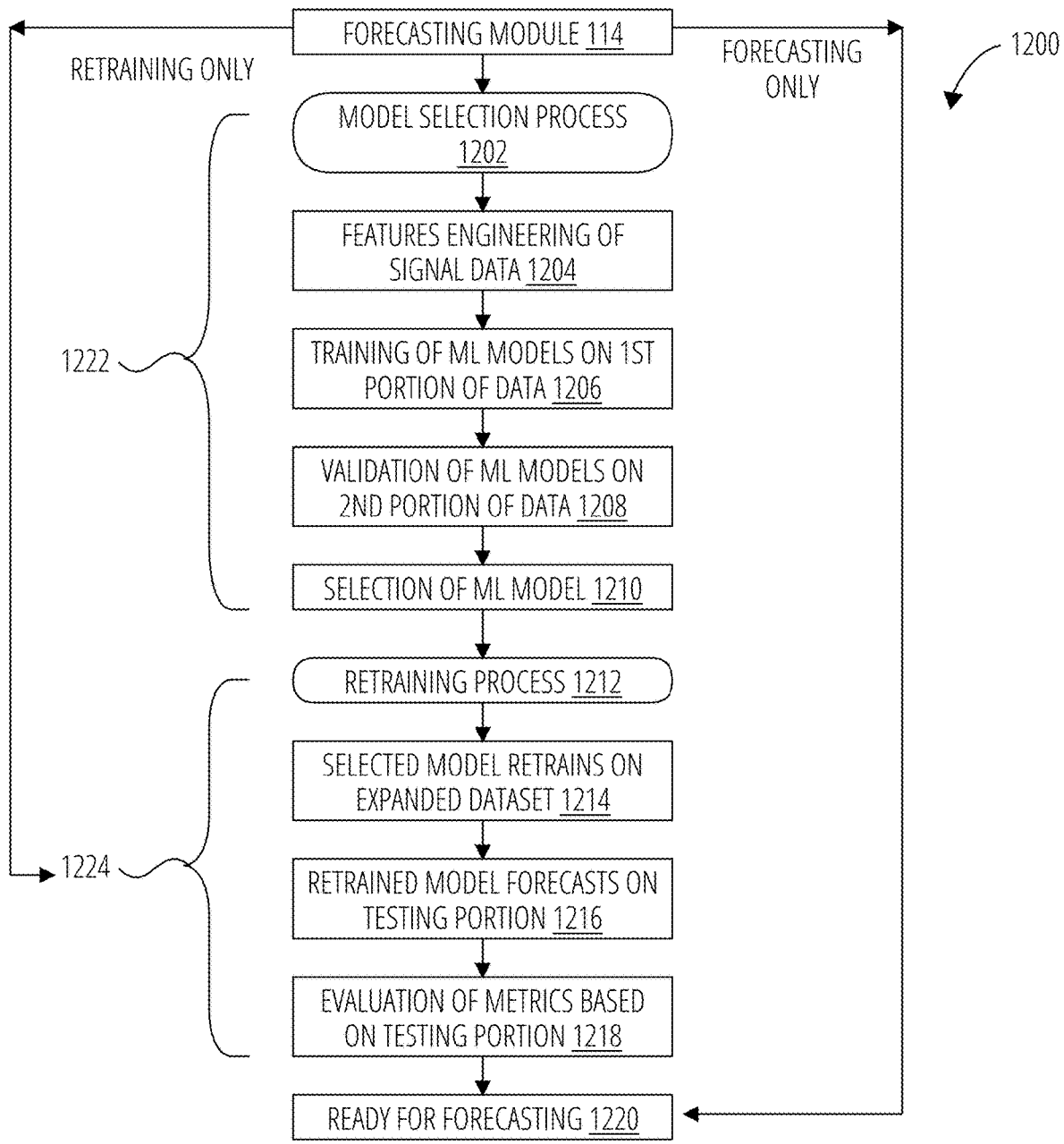
FIG. 12 illustrates a flow chart of a forecasting module in accordance with one embodiment.

FIG. 12 illustrates a flow chart 1200 of a forecasting module 114 in accordance with one embodiment.

Forecasting module 114 receives instructions from monitor module 112, as shown in FIG. 9, to either select a model (block 902), train/retrain (block 904), or forecast (block 906). In FIG. 12, block series 1222 describes a flowchart of the model selection process 1202 in an embodiment; block series 1224 describes a flowchart of the training process 1212 in an embodiment, and block 1220 refers to the forecasting of the trained ML model.

When forecasting module 114 is instructed to conduct a model selection process 1202 by monitor module 112, a first step is to engineer features of signal data (retrieved from ML storage 106) at step block 1204. Features engineering may be automated in the sense that the system can generate features more amenable to machine learning without having a user define one or more transformations of the features engineering process. In some embodiments, selection of transformations may be achieved automatically through methods like cross-validation, dimensionality reduction and independence criteria tests.

The timeframe of signals data used at block 1204 varies, depending on where in flowchart 1000 (of FIG. 10) the model selection process occurs. For example, if the model selection process is selected at block 1006 (i.e. performing a forecast for the first time), then all of the relevant signal data (from the user and external data sources) collected up to the time of receiving the first forecast request, is used. For example, if the model selection process is selected at block 1006 or ML storage 106 (i.e. performing a subsequent forecast), then all of the relevant signal data (from the user and external data sources) collected up to the time of receiving the subsequent request, is used.

Once the features engineering data is prepared, it is used to train, validate and test. In some embodiments, the engineered data is divided chronologically into three portions: a training portion, a validation portion and a test portion. Forecasting module 114 obtains access to a variety of ML models in ML storage 106; each of the ML models is trained on the training portion at block 1206. Each trained ML model then provides a prediction for the time period corresponding to the validation portion at block 1208. Each forecast is evaluated for accuracy, and the most accurate model is selected for further forecasting at block 1210.

In some embodiments, the training portion may be between 50%-80% of the full engineered dataset; the validation portion may be between 10%-25%, and the testing portion between 5%-25%, such that the overall total is 100%. In some embodiments, the training/validation/testing portions are 60%/20%/20%. In some embodiments, the amount of data in the testing portion may be too large for timely execution, in which case, an absolute time frame of data is chosen. As an example, this may be between the last 10-20 weeks of data, or about the last 15 weeks of data, while increasing the size of the training and/or validation portion. Other validation schemes, known in the art, may be used. Examples include nested cross-validation comprising an outer loop and inner loop (for tuning hyperparameters). As an example, validation may be performed over many windows of the training data, rather than one single window.

Retraining of a selected ML model is described in block series 1224, in accordance with one embodiment. A selected ML model is first retrained on an expanded dataset at block 1214; it then makes a forecast corresponding to the period of a testing portion at block 1216, and its accuracy is evaluated, based on its performance in the testing portion, at block 1218. Details of the training/retraining vary slightly, depending on where in the overall process of FIG. 10, the selected model is being trained—within a model selection process (i.e. in block 1006, block 1006, ML storage 106 or 618); or within a retraining process alone (i.e. Block 1006).

Where retraining of the selected ML model is part of a model selection process 1202, the selected ML model is retrained on an expanded engineered data set comprising data corresponding to the training and validation portions of the dataset (at block 1214). It then forecasts predictions corresponding to the time period of the testing portion at block 1216, and its accuracy evaluated at block 1218.

Where retraining of the selected ML model occurs without model selection process 1202 (i.e. retraining only), the selected ML model is retrained on an expanded engineered data set comprising data corresponding to the training and validation portions of the dataset (at block 1214). It then forecasts predictions corresponding to the time period of the testing portion at block 1216, and its accuracy evaluated at block 1218.

Accuracy evaluation of the selected ML model, at block 1218, may be performed by a number of techniques know in the art. For example, error measures such as Mean Absolut Error (MAE) or Mean Absolute Scaled Error (MASE) can be used as an evaluation of accuracy. Accuracy evaluation allows a user to have an idea of demand predictability of a particular product at a particular location for a specified time period.

EXAMPLE

A client requests a 13-week forecast for demand of a particular product at its only store in Kanata, Ontario. The user provides historical data related to the sales of the product at its Kanata location, in the form of point-of-sales data, inventory, promotional information, and the like to ingestion module 302 (of FIG. 1) which pre-processes the data and stores it in ML storage 106. In addition, the user provides data related to the sales of the product at the Kanata location on an ongoing basis, such that the ML storage 106 is updated on an ongoing basis.

External data related to the product sales in Kanata is obtained by external data module 110 from external data source(s) 108. Such external data includes historical weather data for Kanata and the surrounding region, holidays and events throughout the year for Kanata, market indexes for the province of Ontario (in which Kanata is located) and Canada, along with other financial data related to Kanata. The external data is also pre-processed and stored in ML storage 106. As with user data, the external data is updated on an ongoing basis.

The monitor module 112 receives the forecast request from request module 116 and determines whether or not this request is the first request for the particular product at its Kanata store. If it is the first request of its kind, monitor module 112 flags the forecast request for a model selection process by forecasting module 114. On the other hand, it this is a subsequent forecast request, monitor module 112 proceeds through the flowchart shown in FIG. 10, and flags the forecast request to the forecasting module 114 if necessary, or simply instructs the forecasting module 114 to forecast the demand for the next 13 weeks.

Where the forecasting request is the first of its kind, forecasting module 114 conducts a model selection process in which all historical data relevant to the particular product at the Kanata store is queried from the ML storage 106. Forecasting module 114 then generates features (for both external data and user-supplied data) and merged with demand data (the target for the forecast—data already supplied by user). A training and validation set are created from the whole historical set and various methods are applied to find the best configuration of features and models, where each configuration is compared and the best one according to a metric of choice (e.g. MAE, MASE, etc.) is picked. This configuration (e.g. features and hyperparameters) is saved to the datastore and the selected model is trained on a larger training set and its performance is measured on a testing set that corresponds to the most recent data acquired about the product sales at the Kanata store. The ML model and its performance are also stored in ML storage 106.

Then a forecast is computed with the trained model for a period of 13 weeks ahead. In addition, explanations of each point of the forecast are computed according to the features used by the model and what they entailed for each prediction.

Figure 13:
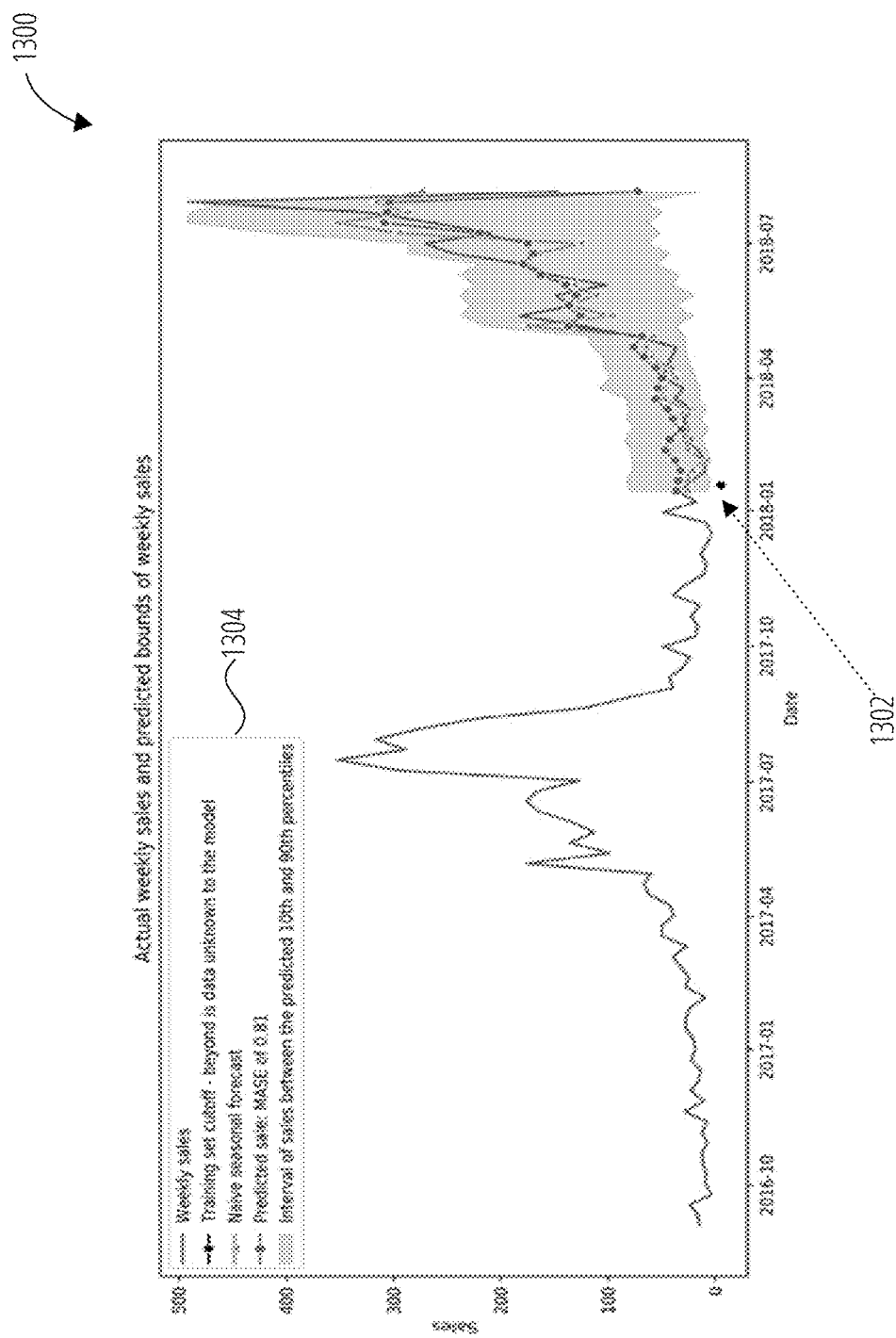
FIG. 13 illustrates a machine learning forecast in accordance with one embodiment.

FIG. 13 illustrates a machine learning forecast 1300 in accordance with one embodiment. In FIG. 13, a request is made for the first time. The sales of the product at a particular store in Kanata is shown on the Y-axis, against a calendar date (from 2016-2018) on the X-axis.

Actual sales are shown (by a solid line) from about September 2016 to August 2018, with sales peaking in 2017 around the month of August, and in 2018 around July-August. Thus, the historical data set is from September 2016 to August 2018, a period of 2 years. The historical data consisted of daily sales at one store for the one product, while external data consisted of holidays (i.e. no weather information, no market indexes).

The total period of initial training and validation is from September 2016 to Jan. 15, 2018, after which, testing takes place (as indicated by black dot 1302). A number of ML models, such as gradient-boosted trees, ensemble of trees and support vector regression, were used during the initial training set. A gradient-boosted tree model, Light GBM, was selected during validation, and retrained on the dataset from September 2016 to Jan. 15, 2018. In this example, all the data, except for the last 20%, was used for training the selected model. In some embodiments, the testing dataset may be the smaller of the dataset of the period of the last 10-20 weeks and the last 20% of the entire dataset. In some embodiments, where the historical data set spans 1 year (52 weeks), the training/validation period can be 40-42 weeks, with remaining 10-12 weeks used for testing the selected model. In some embodiments, a nested validation scheme can be used. The best ML model may be selected according to a configuration set by the user, or any standard criteria such as MASE, MAE, WMAPE (Weighted Mean Absolute Percentage Error), etc.

In FIG. 13, results are shown for the test period of Jan. 15, 2018-Aug. 31, 2018. The forecasted ML results are shown as "predicted sale" (line with solid circles) in the legend table 1304, while the actual sales are labeled as 'weekly sales" (solid line). For comparison, a seasonal forecast (line with solid triangles) is also shown for the test period. The seasonal forecast is implemented by simply copying the weekly sales that happened one year prior. In this example, the season forecast for the weeks of Feb. 20, 2018 to Aug. 31, 2018 is identical to the weekly sales during the weeks of Feb. 20, 2017 to Aug. 31, 2018.

Accuracy of the ML model in FIG. 13 was evaluated relative to the accuracy of the seasonal forecast, using MASE. With the seasonal forecast accuracy normalized to a MASE value of 1.0, the ML model was found to have a MASE value of 0.81; i.e. the ML model was more accurate at predicting weekly sales than the seasonal forecast method.

In addition, FIG. 13 provides an interval of sales between the predicted 10th and 90th percentiles for the ML model. This interval was produced using quantile regression. In some embodiments, a quintile regression approach may not be possible for all ML models. That is, other ML models may use a different scheme (i.e. not quantile regression) to provide such an interval.

Machine learning models are also referred to herein as machine learning forecast models.

Figure 14:
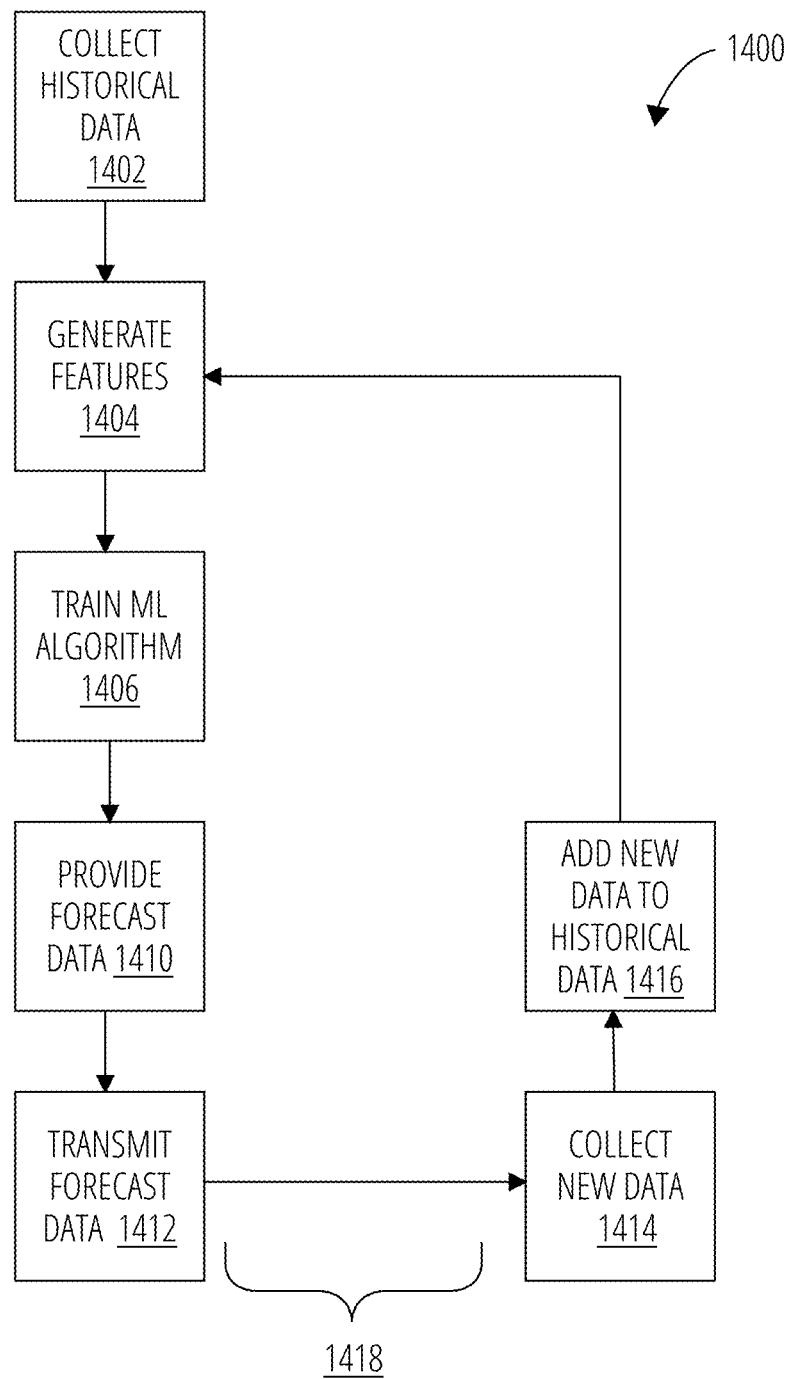
FIG. 14 illustrates a simple flow chart of a method for forecasting using a machine learning technique in accordance with an embodiment.

Demand sensing is commonly relied upon by retailers and manufacturers to ensure adequate supply of a product is in their stores and inventory to meet customer demand. A simple flowchart for an exemplary Method 1400 for forecasting using a machine learning technique according to an embodiment is shown in FIG. 14.

Method 1400 will be described as carried out by System 1502 shown in FIG. 15. Alternatively, Method 1400 may be carried out by another system, a combination of other systems, subsystems, devices or other suitable means provided the operations described herein are performed. Method 1400 may be automated, semi-automated and some blocks thereof may be manually performed.

Figure 15:
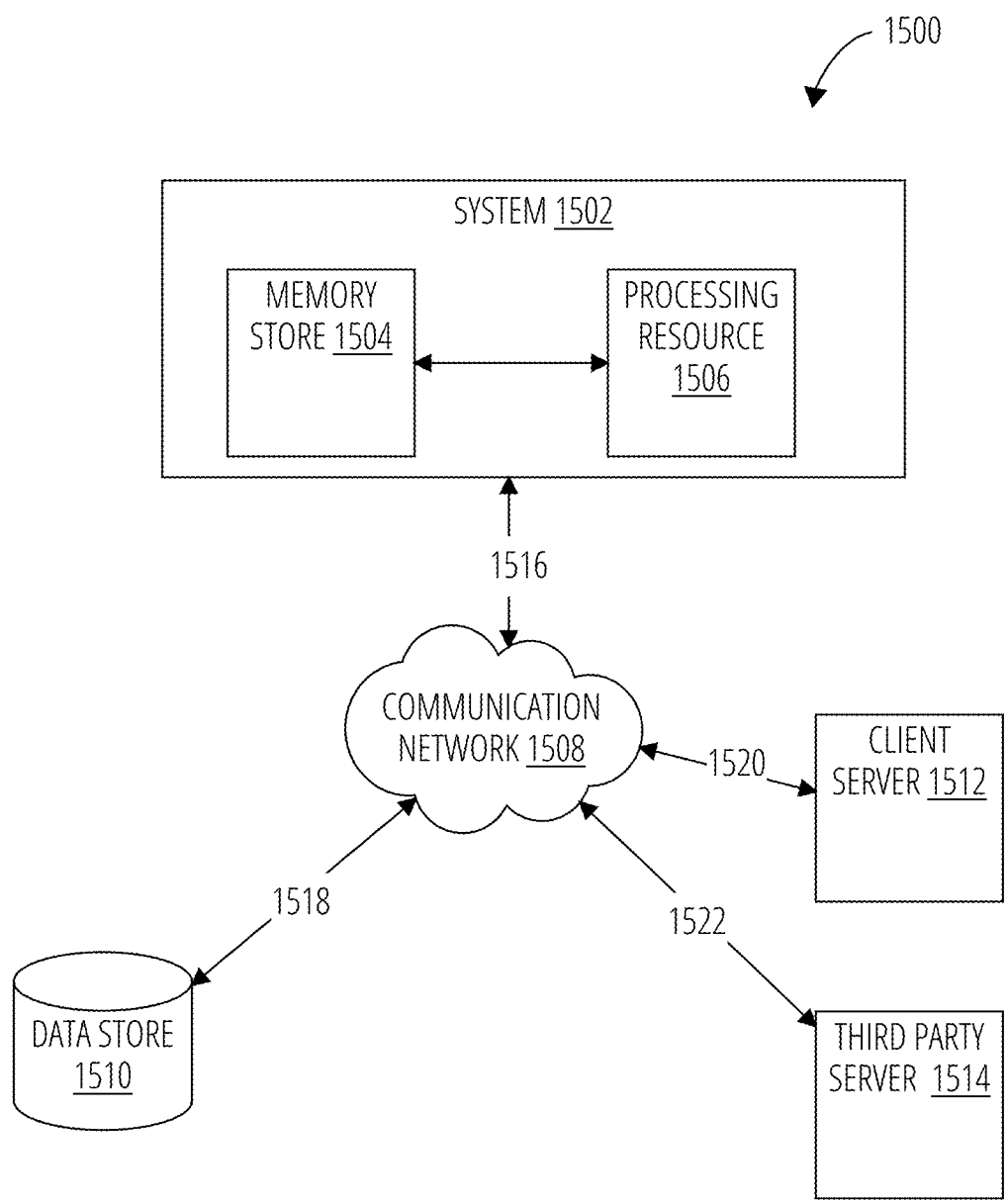
FIG. 15 illustrates a simple block diagram of a system in accordance with an embodiment.

In FIG. 15 System 1502 is shown in an exemplary Environment 1500 with which some embodiments may operate. System 1502 includes a Memory Store 1504 and a Processing Resource 1506. Processing Resource 1506 may include one or more processors and/or controllers, which may take the form of a general or a special purpose processor(s) or controller(s). In exemplary implementations, Processing Resource 1506 may be, or include, microprocessors, microcontrollers, application specific integrated circuits, digital signal processors, and/or other data processing devices. Processing Resource 1506 may be a single device or distributed over a network.

Memory Store 1504 may be or include one or more non-transitory computer-readable storage media, such as optical, magnetic, organic, or flash memory, among other data storage devices and may take any form of computer readable storage media. Remote Data store 1510 may be a single device or may be distributed over a network.

Processing Resource 1506 and Memory Store 1504 may be communicatively coupled by a system communication bus, a wired network, a wireless network, or other connection mechanism and arranged to carry out various operations described herein. Optionally, two or more of these components may be integrated together in whole or in part.

System 1502 is communicatively coupled to a communication Network 1508 as shown by arrow 1516. Communication Network 1508 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication Network 1508 may operate according to one or more communication protocols, such as, General Packet Radio Service (GPRS), Universal Mobile Telecommunications Service (UMTS), Global System for Mobile (GSM), Enhanced Data Rates for GSM Evolution (EDGE), Long Term Evolution (LTE), CDMA (Code-division Multiple Access) (CDMA), WCDMA (Wide Code-division Multiple Access), (High Speed Packet Access (HSPA), Evolved HSPA (HSPA+), Low-power WAN (LPWAN), Wi-Fi, Bluetooth, Ethernet, Hypertext Transfer Protocol Secure (HTTP/S), Transmission Control Protocol/Internet Protocol (TCP/IP), and Constrained Application Protocol/Datagram Transport Layer Security (CoAP/DTLS), or other suitable protocol. Communication Network 1508 may take other forms as well.

Also shown in FIG. 15 is a remote Data store 1510, remote Client server 1512 and remote third Party server 1514, each communicatively coupled to communication Network 1508, as shown by arrow 1518, arrow 1520, and arrow 1522, respectively. For example, System 1502 can communicate with Data store 1510, Client server 1512 and third Party server 1514, via communication Network 1508.

Furthermore, Data store 1510 can communicate with Client server 1512 and third Party server 1514, via communication Network 1508.

In a first example, a retailer owns 1400 stores located at various locations. The retailer, also referred to herein as the user, wishes to receive, for a 4-week (28 day) forecast window, a forecast for the daily demand of a first product for each of the 1400 store locations. Alternatively, and/or optionally, the forecast may be for a different product, a unique store(s), a different forecast window, etc.

At block 1402, Method 1400 includes collecting historical data during a first time interval. For example, the retailer transmits sales data of the first product on a daily basis corresponding to each store location from Client server 1512 to Data store 1510. The sales data is collected and stored daily in Data store 1510 over a first time interval for future use. In this example, the first time interval includes 1 year. In practice, however, sales data may be collected over any time interval, e.g., weeks, months, years, etc. In this example, daily weather data corresponding to each day of that 1 year period is also collected. For instance, daily weather data from third Party server 214, such as a server storing weather conditions, is fetched by Processing Resource 1506 and stored in Data store 1510 for future use. Sales data transmitted by the retailer and the weather data fetched by Processing Resource 1506 over the 1 year period is referred to as historical data. Alternatively, other third party signals may include the time of year, local holidays, events, market indexes at the location, amongst others.

Next, at block 1404, Method 1400 includes generating feature data indicative of features used for training a machine learning algorithm. For example, Processing Resource 1506 may massage, process and/or transform historical data for generating feature data used to train a machine learning algorithm for creating a forecast model.

Next, at block 1406, Method 1400 includes training a machine learning algorithm using the feature data. For example, Processing Resource 1506, trains a machine learning algorithm, such as, a tree-based machine learning algorithm, using the generated feature data for forming a forecast model. Optionally, at block 1406, hyper-parameters of the forecast model may be tuned to improve accuracy of the model.

Next, at block 1410, Method 1400 includes providing forecast data. For example, using the forecasting model, Processing Resource 1506 generates forecast data indicating the daily demand for the first product for each store of the 1400 stores, over a 4-week period.

Next, at block 1412, Method 1400 includes transmitting forecast data to the user. For example, Processing Resource 1506 transmits the forecast data to Client server 1512 via communication Network 1508.

Next, at block 1414, Method 1400 includes collecting new data over a second period of time. For example, the retailer transmits sales data for the first product on a daily basis corresponding to each store from Client server 1512 to Data store 1510. The daily sales data is collected over the second time interval, for instance, 1 week, and stored in Data store 1510 for future use. In practice, however, sales data may be collected over any time interval, e.g., days, weeks, months, etc. In this example, daily weather data corresponding to each day of that 1 week period is also collected. For instance, daily weather data from third Party server 1514, such as a server storing weather conditions, is fetched by Processing Resource 1506 and stored in Data store 1510 for future use. Sales data transmitted by the retailer and the weather data fetched by Processing Resource 1506 over the 1 week period is referred to as new data.

At block 1416, the new data is added to the historical data. For example, the new data is added to the historical data stored in Data store 1510.

Finally, Method 1400 returns to block 1404 wherein feature data is generated. Feature data is based on the new data and is used for training a machine learning algorithm for forming another forecast model.

In practice, Method 1400 may be a portion of a machine learning pipeline. In such cases, the size of historical data and/or new data may be large, e.g., terabytes, petabytes, etc., causing implementation of Method 1400 in a machine learning pipeline to be expensive in terms of time, cost and resources. In the example provided above, although sales data is collected on a daily basis, feature generation, training a machine learning algorithm, and providing a forecast occurs once every 7 days. In some instances, however, a retailer/user may request to receive an updated forecast on a more frequent basis based the most recent sales data available. To accommodate the user's request, the machine learning pipeline would need to be run more frequently, which is expensive as described above, and/or, the pipeline may need re-structuring, which may not be feasible.

Figure 16:
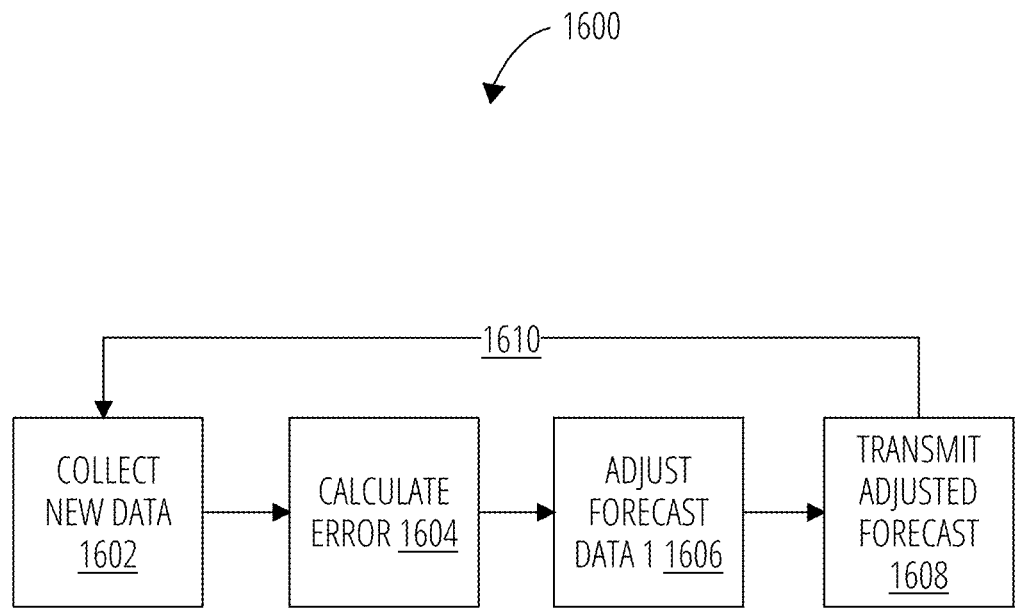
FIG. 16 illustrates is simple flow chart of a method for adjusting a forecast provided by a forecast model in accordance with an embodiment.

According to an embodiment there is a Method 1600 for adjusting forecast data provided by a machine learning model based on new sales data and forecast data. Shown in FIG. 16 is a flow diagram of Method 1600. Method 1600 is described as being carried out by System 1502.

Method 1600 includes blocks 1602, 1604, 1606, and 1608, sequentially, and is included in Method 1400 located between block 1412 and block 1414 of Method 1400, as indicated by bracket 1418.

Continuing with the same example as described herein above with reference to Method 1400, the retailer wishes to receive a daily forecast for each first product corresponding to each of the 1400 store locations.

At block 1602, Method 1600 includes collecting new sales data during a second time interval. For example, the retailer transmits sales data for Day 1 of the 28 day (4-week) forecast window. The sales data includes sales data of the first product corresponding to each store. The sales data is transmitted from Client server 1512 to Data store 1510 and stored in Data store 1510 for future use.

Next, at block 1604, Method 1600 includes determining an error based on forecast data provided at block 1410 and new sales (i.e., actual sales) data collected during the second time interval. For example, Processing Resource 1506 determines an error in the form of an average percentage of error across all stores for the first product between the forecast data and the new sales (i.e., actual sales) data for Day 1.

For instance, for a first store of the 1400 stores, Processing Resource 1506 determines the percentage error between the forecasted demand of the first product corresponding to that store on Day 1 and the new sales (i.e, actual sales) data collected on Day 1. Forecast data for Day 1 indicates product demand for the first product corresponding to the first store to be 10 units. The new sales (i.e, actual sales) data collected for the first product and corresponding to the first store indicates 9 units were actually sold. Processing Resource 1506 determines there is a percentage error of (10−9)/1400=0.10 or 10% error between the forecast data and the new sales (i.e, actual sales) data for the first store location during the second time interval.

Next, for each of the remaining 99 store locations, Processing Resource 1506 determines the percentage error between the forecasted demand of the first product and the new sales (i.e., actual sales) data for Day 1 in a similar manner as described above.

Then Processing Resource 1506 averages the percentage error of all stores. For example, Processing Resource 1506 determines the average percentage error across all stores is 0.02%.

Figure 17:
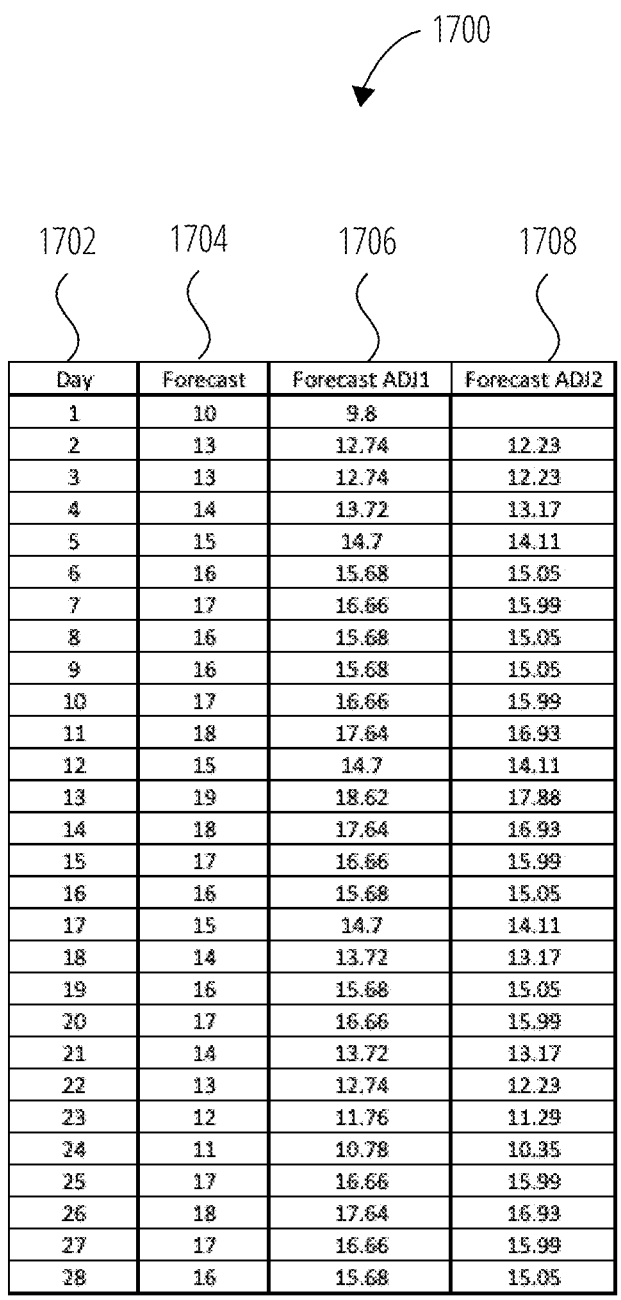
FIG. 17 illustrates exemplary values of forecast data and adjusted forecast data in accordance with an embodiment.

Referring now to FIG. 17, shown in table 1700 is exemplary forecast data 1704 for the first product of a first store over a 4-week window (28 days) provided by the forecast model. For example, as shown in column 1702, on Day 1 10 units of the first product was forecast to be sold at the first store. In a second example, as shown in column 1702, on Day 11 18 units of the first product was forecast to be sold at the first store.

Figure 18:
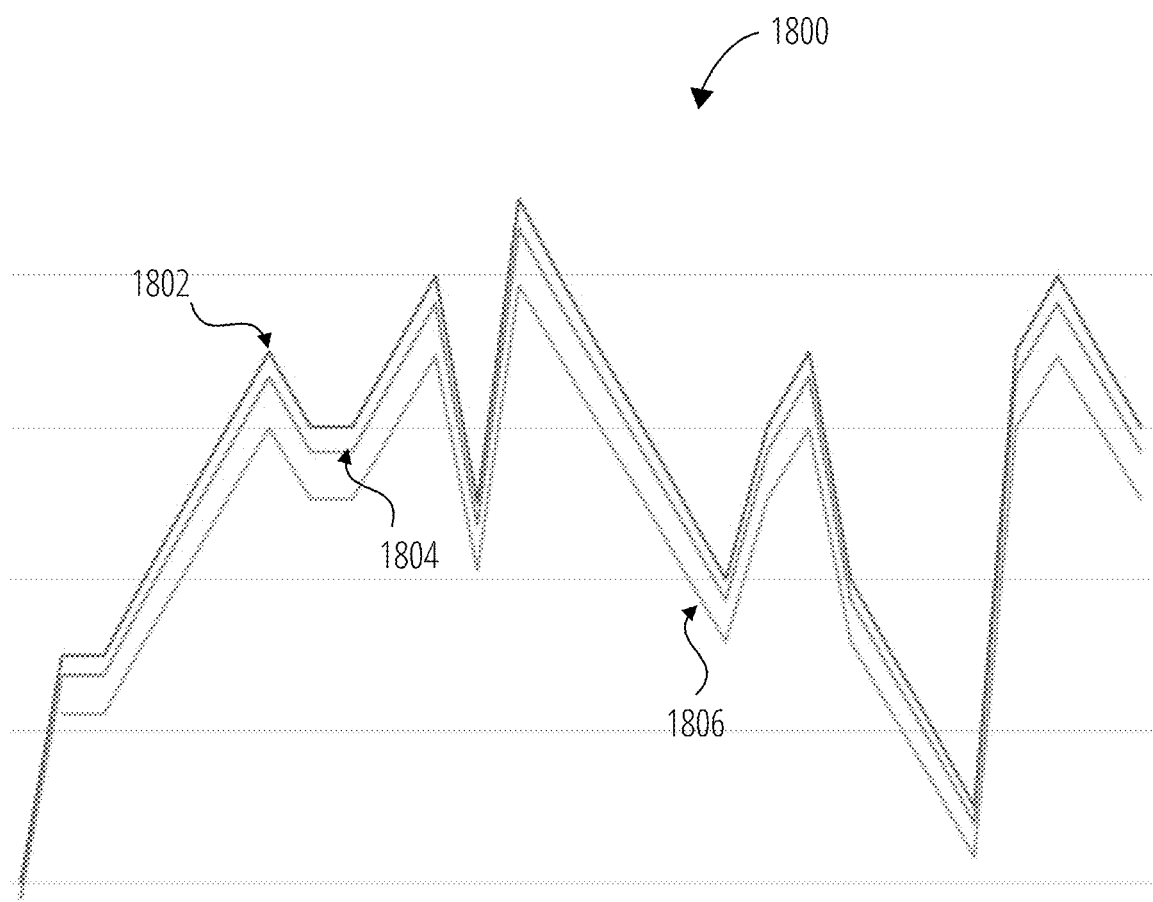
FIG. 18 illustrates a graphical representation of forecast data and adjusted forecast data in accordance with an embodiment.

Next at block 1606, Method 1600 includes removing the error from the forecast data for forming adjusted forecast data. For example, Processing Resource 1506 removes the average percentage error across all stores, 0.02%, from the forecast data for each of the 28 day forecast window, for forming adjusted forecast data. Exemplary adjusted forecast data is shown in column 1706 in table 1700. Now referring to FIG. 18, shown is a graphical representation of forecast data 1802 and adjusted forecast data 1804.

Finally, at block 1608, Method 1600 includes transmitting the adjusted forecast data. For example, Processing Resource 1506 transmits the adjusted forecast data to Client server 1512 via communication Network 1508.

Optionally, Method 1600 returns to block 1602 as indicated by arrow 1610.

At block 1602, Method 1600 includes collecting new sales data during a third time interval. For example, the retailer transmits sales data for Day 2 of the 28 day (4-week) forecast window. The sales data includes sales data of the first product corresponding to each store. The sales data is transmitted from Client server 1512 to Data store 1510 and stored in Data store 1510 for future use.

Next, at block 1604, Method 1600 includes determining an error based on forecast data provided at block 1410 and new sales (i.e., actual sales) data collected during the third time interval. For example, Processing Resource 1506 determines an error in the form of an average percentage of error across all stores for the first product between the forecast data and the new sales (i.e, actual sales) data for Day 2.

For example, Processing Resource 1506 determines the average percentage error across all stores in a similar manner as described above to be 0.77%.

Next, at block 1606, Method 1600 includes removing the error from the forecast data for forming adjusted forecast data. For example, Processing Resource 1506 removes the average percentage error of all stores, 0.77%, from the forecast data for each of the 28 day forecast window, for forming second adjusted forecast data. Exemplary second adjusted forecast data is shown in column 1708 in table 1700. Now referring to FIG. 18, shown is a graphical representation of second adjusted forecast data 1806.

Finally, at block 1608, Method 1600 includes transmitting the adjusted forecast data. For example, Processing Resource 1506 transmits the second adjusted forecast data to Client server 1512 via communication Network 1508.

In the present example, Method 1400 repeats blocks 1602, 1604, 1606, and 1608, in a similar manner as described above for days 3, 4, 5, and 6.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification may be labeled as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium can include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain or store a program for use by or in connection with an instruction execution system, apparatus, or device.

Computer program code for carrying out operations for aspects of the present disclosure may be written in any combination of one or more programming languages, including an object-oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor(s) of a general purpose computer(s), special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a stand-alone program, a component, or other unit suitable for use in a computing environment. A computer program can be deployed to be executed on one computer or can be deployed on multiple computers that are located at one site or distributed across multiple sites and interconnected by a communication network.

As used herein, a "software engine" or an "engine," refers to a software implemented system that provides an output that is different from the input. An engine can be an encoded block of functionality, such as a platform, a library, an object or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows that can be performed by an apparatus, can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (for example, a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification may be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Although the algorithms described above including those with reference to the foregoing flow charts have been described separately, it should be understood that any two or more of the algorithms disclosed herein can be combined in any combination. Any of the methods, modules, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner and can be used separately or in combination.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving, by a processor, a first forecast request;
training, by the processor, a plurality of machine learning forecast models on a first portion of a data set;
validating, by the processor, a machine learning forecast model on a second portion of the data set; and
retraining, by the processor, the machine learning forecast model on a sum of the first portion and the second portion of the data set, the data set comprising processed historical data;
forecasting, by the processor, a forecast based on the first forecast request;
receiving, by the processor, a subsequent forecast request;
selecting, by the processor, a machine learning forecast model when:
i) the data set has been updated by a new class of relevant signal data since a previous forecast request; or
ii) the data set has been updated by an amount of new relevant signal data beyond a first threshold since the previous forecast request; or
iii) the machine learning forecast model has degraded; and
retraining, by the processor, a previously-selected machine learning forecast model when a time interval between successive forecast requests is greater than a second threshold;
using one of the machine learning forecast model selected by the processor and the previously-selected machine learning forecast model for providing first forecast data for a first forecast window, the first forecast data for one or more store locations;
transmitting the first forecast data to a user;
receiving first sales data for the one or more store locations for a second time interval, the second time interval subsequent a first time interval;
determining an error in the first forecast data based on the first forecast data and the first sales data;
removing the error from the first forecast data for forming first adjusted forecast data, the first adjusted forecast data for the one or more store locations; and
transmitting the first adjusted forecast data to the user.

2. The method of claim 1 wherein determining the error in the first forecast data based on the first forecast data and the first sales data includes determining the error between the first forecast data for each of the one or more store locations and the first sales data for each of the one or more store locations corresponding thereto.

3. The method of claim 1 wherein determining the error in the first forecast data based on the first forecast data and the first sales data includes determining a percentage error between the first forecast data for each of the one or more store locations and the first sales data for each of the one or more store locations and an average percentage error thereof.

4. The method of claim 3 wherein removing the error from the first forecast data for forming the first adjusted forecast data includes removing the average percentage error from the first forecast data for each of the one or more store locations, the first adjusted forecast data includes first adjusted forecast data for each of the one or more store locations.

5. The method of claim 1 further including,
collecting second data for a third time interval, the second data including at least the historical data and the first sales data;
generating second feature data based on the second data;
processing second feature data by the processor for training a machine learning algorithm for forming a second forecast model;
using the second forecast model for providing second forecast data for a second forecast window, the second forecast data including second forecast data for the one or more store locations; and
transmitting the second forecast data to the user.

6. The method of claim 1 further includes,
receiving second sales data, the second sales data for the one or more store locations during a fourth time interval subsequent the second time interval;
determining an error in the first forecast data based on the first forecast data and the second sales data;
removing an error from the first forecast data for forming third forecast data; and
transmitting the third forecast data to the user.

7. A non-transitory computer-readable storage medium, the computer-readable storage medium including instructions that when executed by a computer, cause the computer to:
receive, by a processor, a first forecast request;
train, by the processor, a plurality of machine learning forecast models on a first portion of a data set;
validate, by the processor, a machine learning forecast model on a second portion of the data set; and
retrain, by the processor, the machine learning forecast model on a sum of the first portion and the second portion of the data set, the data set comprising processed historical data;
forecast, by the processor, a forecast based on the first forecast request;
receive, by the processor, a subsequent forecast request;
select, by the processor, a machine learning forecast model when:
i) the data set has been updated by a new class of relevant signal data since a previous forecast request; or ii) the data set has been updated by an amount of new relevant signal data beyond a first threshold since the previous forecast request; or iii) the machine learning forecast model has degraded; and retrain, by the processor, a previously-selected machine learning forecast model when a time interval between successive forecast requests is greater than a second threshold;

using one of the machine learn forecast model selected by the processor and the previously-selected machine learning forecast model for providing first forecast data for a first forecast window, the first forecast data for one or more store locations;

transmit the first forecast data to a user;

receive first sales data for the one or more store locations for a second time interval, the second time interval subsequent a first time interval;

determine an error in the first forecast data based on the first forecast data and the first sales data;

remove the error from the first forecast data for forming first adjusted forecast data, the first adjusted forecast data for the one or more store locations; and transmit the first adjusted forecast data to the user.

8. The computer-readable storage medium of claim 7 wherein determining the error in the first forecast data based on the first forecast data and the first sales data includes determining the error between the first forecast data for each of the one or more store locations and the first sales data for each of the one or more store locations corresponding thereto.

9. The computer-readable storage medium of claim 7 wherein determining the error in the first forecast data based on the first forecast data and the first sales data includes determining a percentage error between the first forecast data for each of the one or more store locations and the first sales data for each of the one or more store locations and an average percentage error thereof.

10. The computer-readable storage medium of claim 9 wherein removing the error from the first forecast data for forming the first adjusted forecast data includes removing the average percentage error from the first forecast data for each of the one or more store locations, the first adjusted forecast data includes first adjusted forecast data for each of the one or more store locations.

11. The computer-readable storage medium of claim 7 including instructions that when executed by a computer further causes the computer to:

collect second data for a third time interval, the second data including at least the historical data and the first sales data;

generate second feature data based on the second data;

process second feature data by the processor for training a machine learning algorithm for forming a second forecast model;

using the second forecast model for providing second forecast data for a second forecast window, the second forecast data include second forecast data for the one or more store locations; and transmit the second forecast data to the user.

12. The computer-readable storage medium of claim 7 including instructions that when executed by a computer further causes the computer to:

receive second sales data, the second sales data for the one or more store locations during a fourth time interval subsequent the second time interval;

determine an error in the first forecast data based on the first forecast data and the second sales data;

remove an error from the first forecast data for forming third forecast data; and transmit the third forecast data to the user.

13. A system comprising:

a processor; and a memory storing instructions that, when executed by the processor, configure the system to:

receive, by the processor, a first forecast request;

train, by the processor, a plurality of machine learning forecast models on a first portion of a data set;

validate, by the processor, a machine learning forecast model on a second portion of the data set; and retrain, by the processor, the machine learning forecast model on a sum of the first portion and the second portion of the data set, the data set comprising processed historical data;

forecast, by the processor, a forecast based on the first forecast request;

receive, by the processor, a subsequent forecast request;

select, by the processor, a machine learning forecast model when:

i) the data set has been updated by a new class of relevant signal data since a previous forecast request; or ii) the data set has been updated by an amount of new relevant signal data beyond a first threshold since the previous forecast request; or iii) the machine learning forecast model has degraded; and retrain, by the processor, a previously-selected machine learning forecast model when a time interval between successive forecast requests is greater than a second threshold;

using one of the machine learn forecast model selected by the processor and the previously-selected machine learning forecast model for providing first forecast data for a first forecast window, the first forecast data for one or more store locations;

transmit the first forecast data to a user;

receive first sales data for the one or more store locations for a second time interval, the second time interval subsequent a first time interval;

determine an error in the first forecast data based on the first forecast data and the first sales data;

remove the error from the first forecast data for forming first adjusted forecast data, the first adjusted forecast data for the one or more store locations; and transmit the first adjusted forecast data to the user.

14. The system of claim 13 wherein determining the error in the first forecast data based on the first forecast data and the first sales data includes determining the error between the first forecast data for each of the one or more store locations and the first sales data for each of the one or more store locations corresponding thereto.

15. The system of claim 13 wherein determining the error in the first forecast data based on the first forecast data and the first sales data includes determining a percentage error between the first forecast data for each of the one or more store locations and the first sales data for each of the one or more store locations and an average percentage error thereof.

16. The system of claim 15 wherein removing the error from the first forecast data for forming the first adjusted forecast data includes removing the average percentage error from the first forecast data for each of the one or more store locations, the first adjusted forecast data includes first adjusted forecast data for each of the one or more store locations.

17. The system of claim 13 further configured to:

collect second data for a third time interval, the second data including at least the historical data and the first sales data;

generate second feature data based on the second data;

process second feature data by the processor for training a machine learning algorithm for forming a second forecast model;

using the second forecast model for providing second forecast data for a second forecast window, the second forecast data include second forecast data for the one or more store locations; and transmit the second forecast data to the user.

18. The system of claim 13 further configured to:

receive second sales data, the second sales data for the one or more store locations during a fourth time interval subsequent the second time interval;

determine an error in the first forecast data based on the first forecast data and the second sales data;

remove an error from the first forecast data for forming third forecast data; and transmit the third forecast data to the user.

* * * * *